US012556098B2

(12) United States Patent
Ikriannikov et al.

(10) Patent No.: US 12,556,098 B2
(45) Date of Patent: Feb. 17, 2026

(54) SWITCHING POWER CONVERTERS INCLUDING TRANSFORMERS AND INJECTION STAGES, AND ASSOCIATED METHODS

(71) Applicant: Maxim Integrated Products, Inc, San Jose, CA (US)

(72) Inventors: Alexandr Ikriannikov, San Jose, CA (US); Alberto Giovanni Viviani, Moutain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 365 days.

(21) Appl. No.: 18/305,575

(22) Filed: Apr. 24, 2023

(65) Prior Publication Data

US 2023/0378874 A1    Nov. 23, 2023

Related U.S. Application Data

(60) Provisional application No. 63/365,046, filed on May 20, 2022.

(51) Int. Cl.
     *H02M 1/14*         (2006.01)
     *H02M 3/158*       (2006.01)

(52) U.S. Cl.
     CPC ........... *H02M 3/1584* (2013.01); *H02M 1/14* (2013.01)

(58) Field of Classification Search
     CPC .............................. H02M 3/1584; H02M 1/14
     See application file for complete search history.

(56) References Cited

U.S. PATENT DOCUMENTS

| | | | |
|---|---|---|---|
| 10,396,673 B1* | 8/2019 | Presti | H02M 1/38 |
| 12,057,767 B2* | 8/2024 | Ikriannikov | H02M 1/143 |
| 2022/0368214 A1 | 11/2022 | Ikriannikov et al. | |
| 2023/0369977 A1* | 11/2023 | Ikriannikov | H02M 1/44 |
| 2024/0396433 A1* | 11/2024 | Ikriannikov | H02M 1/143 |
| 2024/0396448 A1* | 11/2024 | Ikriannikov | H02M 3/155 |
| 2025/0192661 A1* | 6/2025 | Ikriannikov | H02M 3/003 |

FOREIGN PATENT DOCUMENTS

| | | |
|---|---|---|
| CN | 117097166 A | 11/2023 |
| DE | 102023113038 A1 | 11/2023 |
| DE | 102023113038 A9 | 1/2024 |

OTHER PUBLICATIONS

Technical Disclosure Commons, Fast multi-phase trans-inductor voltage regulator, May 9, 2019, 15 pages.
Xu et al., Novel Coupled-Inductor Multi-phase VRs, IEEE Applied Power Electronics Conference, 2007, pp. 113-119.

* cited by examiner

*Primary Examiner* — Adolf D Berhane
(74) *Attorney, Agent, or Firm* — Schwegman Lundberg & Woessner, P.A.

(57) ABSTRACT

A method for operating a switching power converter to reduce ripple current magnitude includes (a) controlling duty cycle of a plurality power stages of the switching power converter to regulate at least one parameter of the switching power converter, each power stage including a respective power transformer, and (b) controlling an injection stage of the switching power converter to reduce voltage across leakage inductance of each power transformer, the injection stage including an injection transformer that is electrically coupled to a respective secondary winding of each power transformer.

20 Claims, 24 Drawing Sheets

SWITCHING POWER CONVERTERS INCLUDING TRANSFORMERS AND INJECTION STAGES, AND ASSOCIATED METHODS

RELATED APPLICATIONS

This application claims benefit of priority to U.S. Provisional Patent Application No. 63/365,046, filed on May 20, 2022, which is incorporated herein by reference.

BACKGROUND

Switching power converters are widely used in electronic devices, such as to provide a regulated electrical power source. A switching power converter is configured such that its solid-state power switching devices do not continuously operate in their active states; instead, the switching devices repeatedly switch between their on-states and off-states. Although switching power converters can achieve high efficiency, particularly under heavy load conditions, they typically exhibit ripple current due to switching action of their switching devices. Ripple current is generally undesirable because it causes power losses and ripple voltage.

Some multiphase switching power converters include a transformer in each phase, where secondary windings of the transformers are electrically coupled in series. Each transformer exhibits magnetizing inductance and leakage inductance. Magnetizing inductance is inductance associated with magnetic flux linking the primary and secondary windings, while leakage inductance is inductance associated with magnetic flux generated by current flowing through one of the primary and second windings that does not couple to the other of the primary and secondary windings.

DETAILED DESCRIPTION OF THE EMBODIMENTS

Disclosed herein are switching power converters including transformers and injection stages which significantly advance the state of the art. The new switching power converters are capable of achieving small ripple current magnitude at essentially any duty cycle. Consequently, the new switching power converters may incur smaller losses than otherwise similar conventional switching power converters, due to their ability to operate at low ripple current magnitude over a wide range of duty cycles. Additionally, the low ripple current magnitude of the new switching power converters promotes low ripple voltage magnitude, thereby potentially enabling relaxed filtering requirements relative to conventional switching power converters.

Figure 1:
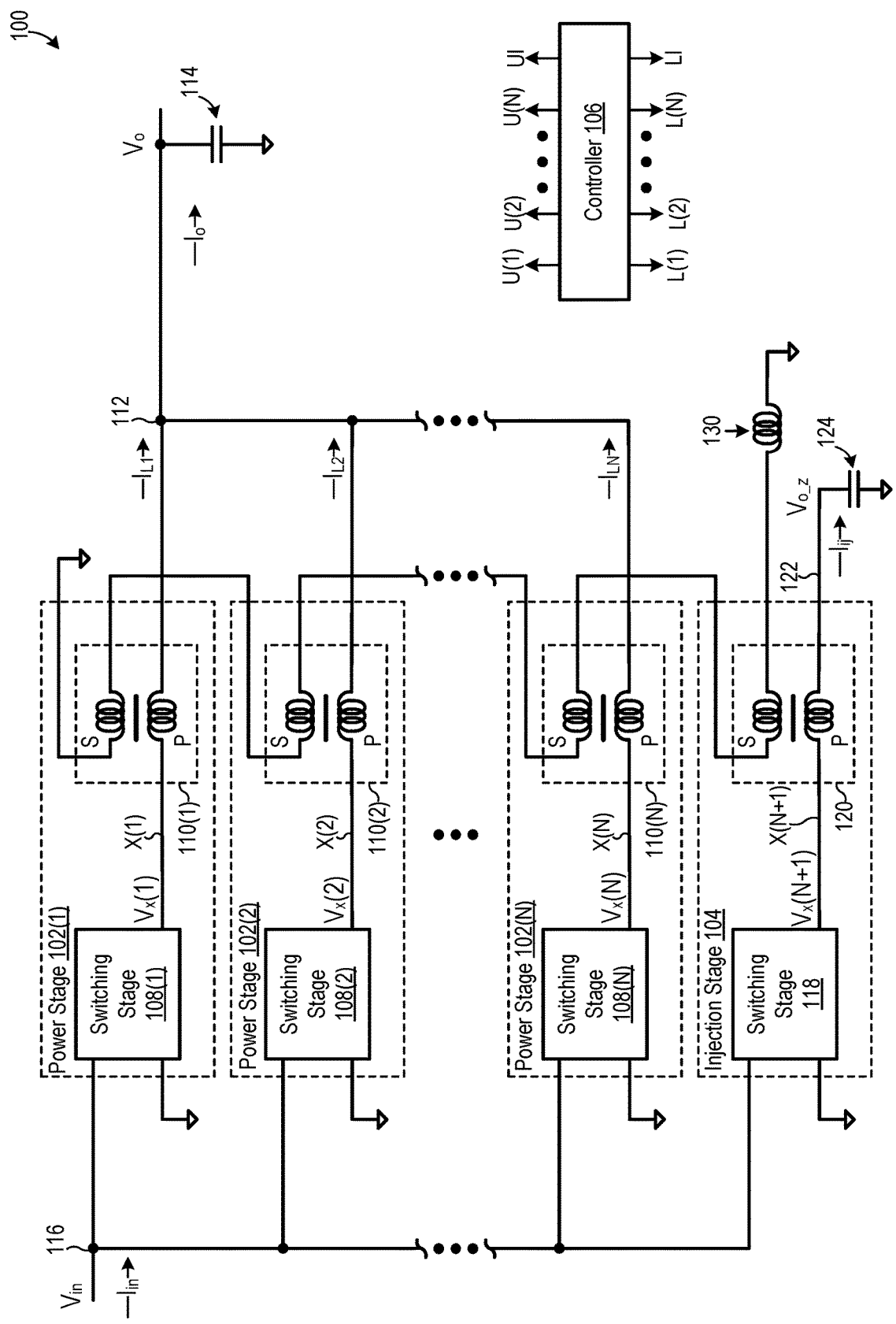
FIG. 1 is a schematic diagram of a multi-phase switching power converter including transformers and an injection stage, according to an embodiment.

FIG. 1 is a schematic diagram of a multi-phase switching power converter 100, which is one embodiment of the new switching power converters disclosed herein. Switching power converter 100 includes N power stages 102, an injection stage 104, and a controller 106, where N is an integer greater than one. In this document, specific instances of an item may be referred to by use of a numeral in parentheses (e.g., power stage 102(1)) while numerals without parentheses refer to any such item (e.g., power stages 102). Each power stage 102 corresponds to a respective phase of switching power converter 100, such that switching power converter 100 is an N-phase switching power converter. In particular, power stage 102(1) corresponds to a first phase of switching power converter 100, power stage 102(2) corresponds to a second phase of switching power converter 100, as so on.

Each power stage 102 includes a power switching stage 108 and a power transformer 110, where the power switching stage 108 electrically coupled to a primary winding P of the power transformer 110 at a switching node X. The primary winding P of each power transformer 110 is electrically coupled between the switching node X of its respective power stage 102 and a common output node 112. For example, primary winding P of power transformer 110(1) is electrically coupled between switching node X(1) and output node 112, and primary winding P of power transformer 110(2) is electrically coupled between switching node X(2) and output node 112. Output node 112 has a voltage $V_o$, and an output current $I_o$ flows to a load (not shown) electrically coupled to output node 112. Output current $I_o$ could have a negative polarity without departing from the scope hereof. One or more capacitors 114 are optionally electrically coupled to output node 212.

Each power switching stage 108 is configured to repeatedly switch the switching node X of its power stage 102 between an input power node 116 and ground, in response to control signals U and L generated by controller 106. Specifically, power switching stage 108(1) is configured to repeatedly switch node X(1) between input power node 116 and ground in response to control signals U(1) and L(1), power switching stage 108(2) is configured to repeatedly switch node X(2) between input power node 116 and ground in response to control signals U(2) and L(2), and so on. Input power node 116 is at a voltage $V_{in}$, and each power switching stage 108 accordingly repeatedly switches node X of its power stage 102 between voltage $V_{in\_a}$nd zero volts relative to ground. An input current $I_{in}$ flows from an electrical power source (not shown) to switching power converter 100 via input power node 116. Input current $I_{in}$ could have a negative polarity without departing from the scope hereof. A primary winding P of a given power transformer 110(1) in switching power converter 100 is driven "high" when its respective switching node X is at voltage $V_{in}$, and the primary winding P is driven "low" when its respective switching node X is at zero volts relative to ground. For example, primary winding P of power transformer 110(1) is driven high when switching node X(1) is at voltage $V_{in}$, and primary winding P of power transformer 110(1) is driven low when switching node X(1) is at zero volts relative to ground. In this document, the term "ground" refers to a reference node that need not be the same as earth ground.

Injection stage 104 includes an injection switching stage 118 and an injection transformer 120, where injection switching stage 118 is electrically coupled to a primary winding P of injection transformer 120 at a switching node X(N+1). Primary winding P of injection transformer 120 is electrically coupled between switching node X(N+1) and injection output node 122. Injection output node 122, which is separate from output power node 112, is at a voltage $V_{o\_z}$, and one or more capacitors 124 are electrically coupled to injection output node 122. Injection switching stage 118 is configured to repeatedly switch node X(N+1) between input power node 116 and ground in response to control signals UI and LI. Similar to primary windings P of power transformers 110, primary winding P of injection transformer 120 is driven high when switching node X(N+1) is at voltage $V_{in}$, and primary winding P of injection transformer 120 is driven low when switching node X(N+1) is at zero volts relative to ground. Injection stage 104 does not handle a direct current (DC) component of output current $I_o$. Instead, controller 106 controls injection stage 104 to reduce, or even essentially eliminate, alternating current (AC) voltage across leakage inductances of power transformers 110, as discussed below.

Secondary windings S of power transformers 110, as well as secondary winding S of injection transformer 120, are electrically coupled in series with each other. While FIG. 1 depicts the series connections of secondary windings S being partially embodied by a ground node, secondary windings S could alternately be isolated from ground, as long as they are electrically coupled in series. An optional tuning inductor 130 is electrically coupled in series with secondary windings S of power transformers 110, as well as with secondary winding S of injection transformer 120. The topological location of tuning inductor 130 could vary as long as it is electrically coupled in series with secondary windings S. For example, tuning inductor 130 could be electrically coupled between respective secondary windings S of power transformers 110(1) and 110(2), instead of being electrically coupled between secondary winding S of injection transformer 120 and ground. While tuning inductor 130 is depicted as being a discrete inductor, tuning inductor 130 could instead be embodied by intrinsic inductance of a circuit including secondary windings S, particularly in applications where tuning inductor 130 need only have a small inductance value. Furthermore, tuning inductor 130 could be omitted, or tuning inductor 130 could be replaced with a plurality of tuning inductors, without departing from the scope hereof.

Figure 2:
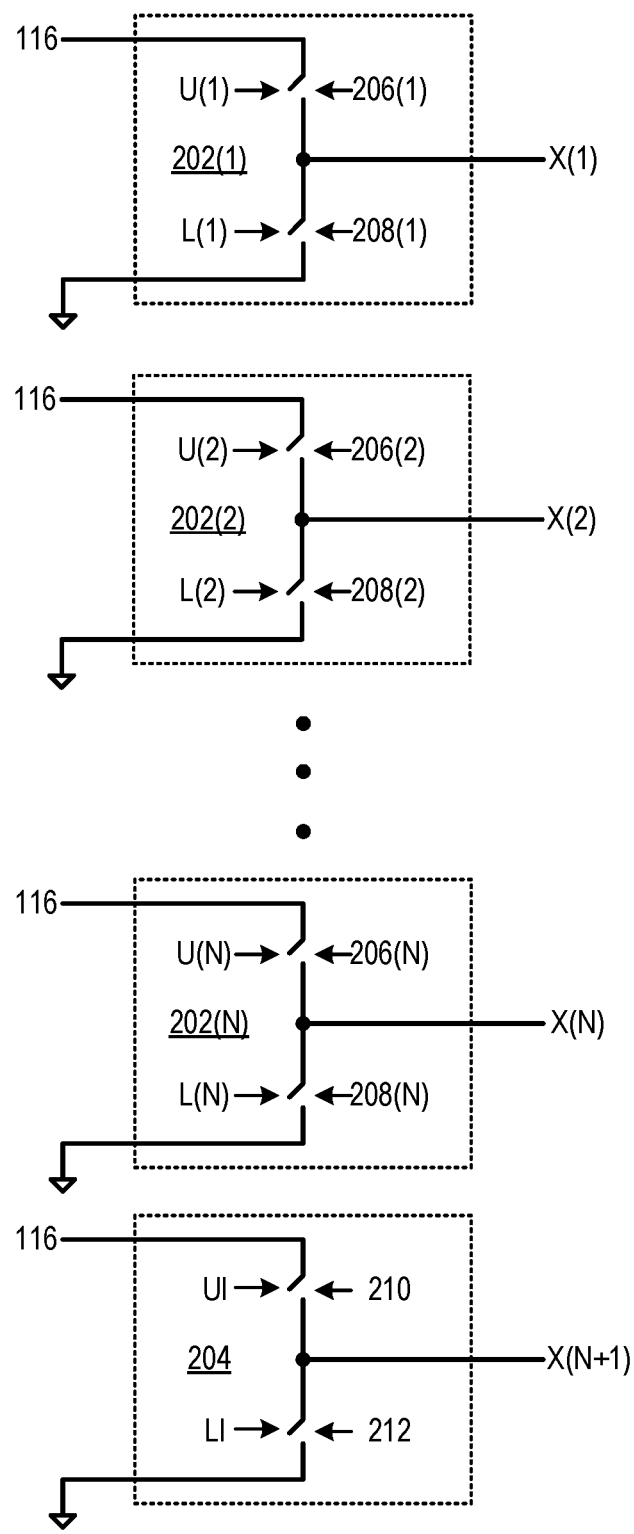
FIG. 2 is a schematic diagram one possible implementation of switching stages of the FIG. 1 switching power converter.

FIG. 2 illustrates one possible implementation of the switching stages of switching power converter 100. Specifically, FIG. 2 is a schematic diagram of N power switching stages 202 and an injection switching stage 204, where (a) power switching stages 202 are an embodiment of power switching stages 108 and (b) injection switching stage 204 is an embodiment of injection switching stage 118. Each power switching stage 202 includes an upper switching device 206 and a lower switching device 208. Each upper switching device 206 is electrically coupled between input power node 116 and the switching node X of its respective power stage. Each lower switching device 208 is electrically coupled between the switching node X of its respective power stage and ground. For example, upper switching device 206(1) is electrically coupled between input power node 116 and switching node X(1), and lower switching device 208(1) is electrically coupled between switching node (X1) and ground. Each upper switching device 206 switches in response to a respective control signal U from controller 106, and each lower switching device 208 switches in response to a respective control signal L from controller 106. For example, in some embodiments, each upper switching device 206 operates in its on (conductive) state when its respective control signal U is asserted, and the switching device operates in its off (non-conductive state) when its respective control signal U is de-asserted. Similarly, in some embodiments, each lower switching device 208 operates in its on (conductive) state when its respective control signal L is asserted, and the switching device operates in its off (non-conductive state) when its respective control signal L is de-asserted. Each switching device 206 and 208 includes, for example, one or more transistors.

Injection switching stage 204 includes an upper switching device 210 and a lower switching device 212. Upper switching device 210 is electrically coupled between input power node 116 and switching node X(N+1), and lower switching device 212 is electrically coupled between switching node X(N+1) and ground. Upper switching device 210 switches in response to control signal UI from controller 106, and lower switching device 212 switches in response to control signal LI from controller 106. For example, in certain embodiments, upper switching device 210 operates in its on (conductive) state when control signal UI is asserted, and the switching device operates in its off (non-conductive state) when its control signal UI is de-asserted. Similarly, in some embodiments, lower switching device 212 operates in its on (conductive) state when control signal LI is asserted, and the switching device operates in its off (non-conductive state) when control signal LI is de-asserted. Each switching device 210 and 212 includes, for example, one or more transistors. In some embodiments, upper switching device 210 has a smaller current carrying capability than each upper switching device 206, and lower switching device 212 has a smaller current carrying capability than each lower switching device 208, due to injection stage 204 not needing to handle the DC component of output current $I_o$.

Referring again to FIG. 1, controller 106 is implemented, for example, by analog and/or electronic circuitry. In some embodiments, controller 106 is at least partially implemented by a processor (not shown) executing instructions in the form of software and/or firmware stored in a memory (not shown). Although controller 106 is depicted as being a discrete element for illustrative simplicity, controller 106 could be partially or fully integrated with one or more other elements of switching power converter 100. For example, some subsystems of controller 106 could be incorporated in one or more of power switching stages 108 and/or injection switching stage 118. Additionally, FIG. 1 should not be construed to require that there be a separate control bus for each control signal. For example, controller 106 could be implemented by a combination of a central integrated circuit and local control logic integrated in each switching stage 108 and 118, with a single control bus running from the central integrated circuit to each switching stage 108 and 118. Furthermore, controller 106 could be configured to derive control signals UI and LI from one or more of control signals U and L, such as by using logic circuitry, instead of by independently generating control signals UI and LI. Moreover, controller 106 may include multiple constituent elements that need not be co-packaged or even disposed at a common location.

Controller 106 is configured to generate control signals U and L to control duty cycle (D) of power stages 102, where duty cycle is a portion of a switching cycle that a primary winding P of a power transformer 110 is driven high, to regulate at least one parameter of switching power converter 100. Controller 106 is configured to vary duty cycle of power stages 102, for example, using a pulse width modulation (PWM) technique and/or a pulse frequency modulation (PFM) technique. Examples of possible regulated parameters include, but are not limited, magnitude of input voltage $V_{in}$, magnitude of input current $I_{in}$, magnitude of output voltage $V_o$, and magnitude of output current $I_o$. For example, in some embodiments, controller 106 is configured to generate control signals U and L to regulate magnitude of output voltage $V_o$, and controller 106 accordingly generates control signals U and L during continuous conduction operation of switching power converter 100 such that duty cycle of power stages 102 is equal to a ratio of output voltage magnitude $V_o$ over input voltage magnitude $V_{in}$. For example, if output voltage $V_o$ is to be regulated to two volts and input voltage $V_{in}$ is eight volts, controller 106 would generate control signals U and L such that duty cycle of power stages 102 is 0.25. Controller 106 is optionally configured to generate control signals U and L such that power stages 102 switch out-of-phase with each other. For example, in some embodiments, controller 106 is configured to generate control signals U and L such that each power stage 102 switches 360/N degrees out of phase with an adjacent power stage 102 in the phase domain.

Figure 3:
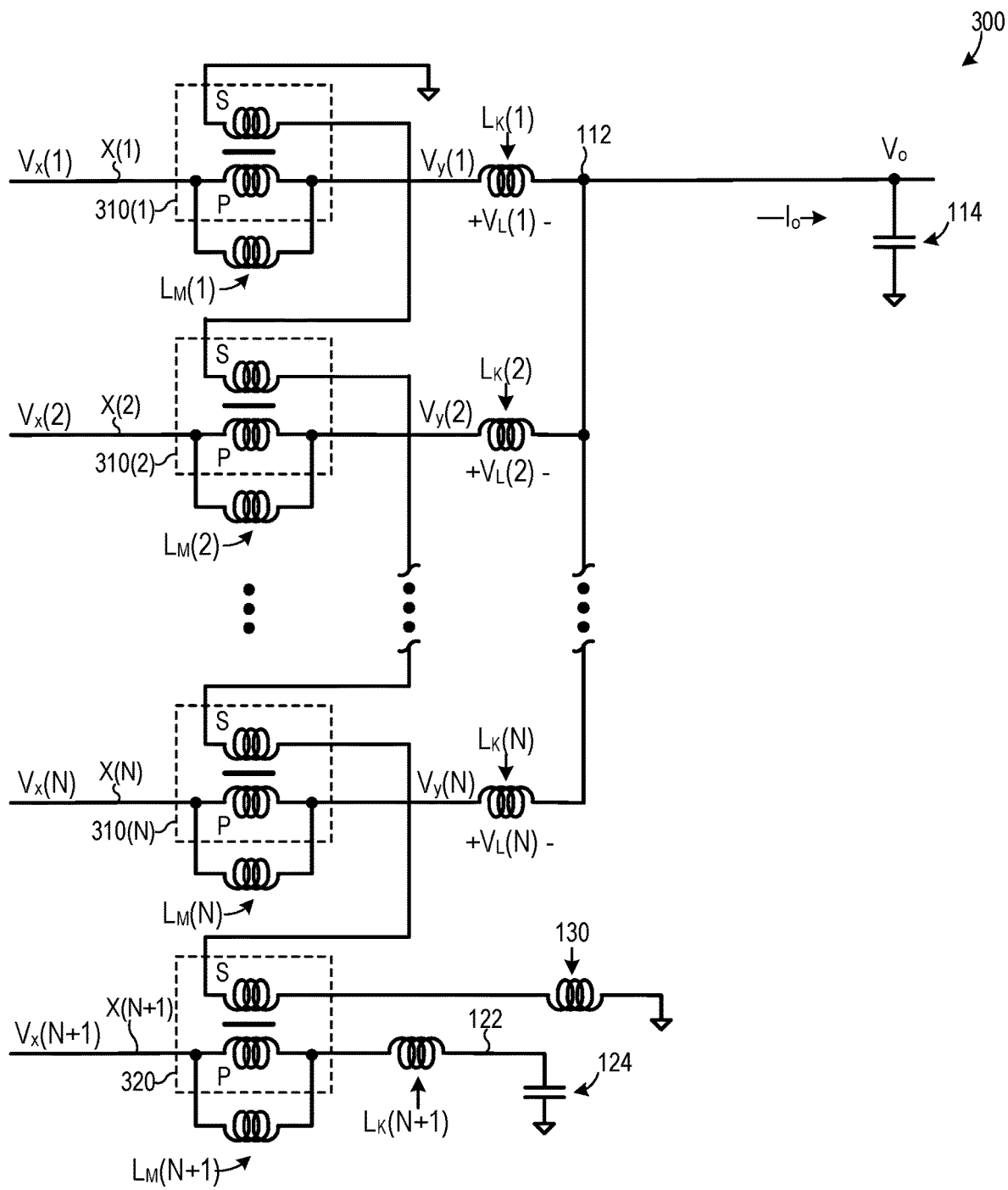
FIG. 3 is an electrical model of transformers of the FIG. 1 switching power converter.

Controller 106 is further configured to generate control signals UI and LI to control injection stage 104 such that the injection stage injects magnetic flux in each power transformer 110 in a manner which reduces voltage across leakage inductance of each power transformer 110. Such reduction in voltage across leakage inductances advantageously reduces, or even essentially eliminates, magnitude of ripple current associated with charging and discharging of leakage inductances. To help appreciate this feature, refer to FIG. 3, which is an approximate electrical model of the transformers of switching power converter 100. Each power transformer 110 is modeled in FIG. 3 by a respective ideal transformer 310, a respective magnetizing inductance $L_M$, and a respective leakage inductance $L_k$. Each magnetizing inductance $L_M$ is electrically coupled in parallel with the primary winding P of its respective ideal transformer 310, and each leakage inductance $L_k$ is electrically coupled in series with the primary winding P of its respective ideal transformer 310. Similarly, injection transformer 120 is modeled in FIG. 3 by an ideal transformer 320, a magnetizing inductance $L_M(N+1)$, and a leakage inductance $L_K(N+1)$. Magnetizing inductance $L_M(N+1)$ is electrically coupled in parallel with the primary winding P of ideal transformer 320, and leakage inductance $L_K(N+1)$ is electrically coupled in series with the primary winding P of ideal transformer 320.

Ripple current associated with leakage inductances $L_k$ results from respective AC voltages $V_L$ across the leakage inductances. Accordingly, controller 106 is configured to generate control signals UI and LI to operate injection stage 104 in a manner that reduces voltages $V_L$ across leakage inductances, to reduce ripple current magnitude. For example, FIGS. 4A-4D are graphs collectively illustrating one example of operating of an embodiment of switching power converter 100 where N is equal to two, such that switching power converter 100 includes two power stages 102 and one injection stage 104. Graphs 4A-4D assume that the magnetizing inductance value of each transformer 110 and 120 is much greater than any leakage inductance value of the transformers.

Figure 4A:
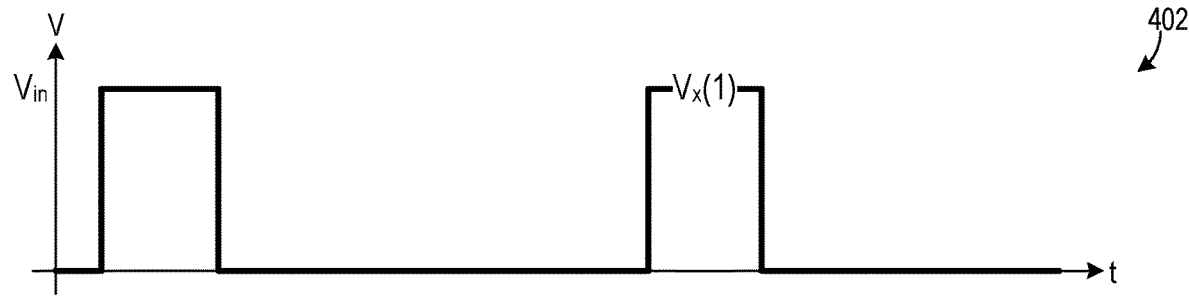
FIGS. 4A-4D are graphs illustrating one example of operation of an embodiment of the FIG. 1 switching power converter including two power stages.
Figure 4B:
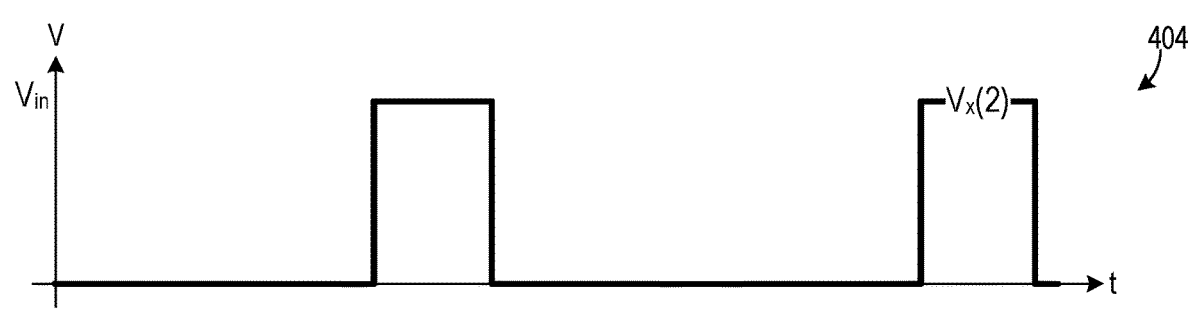
Figure 4C:
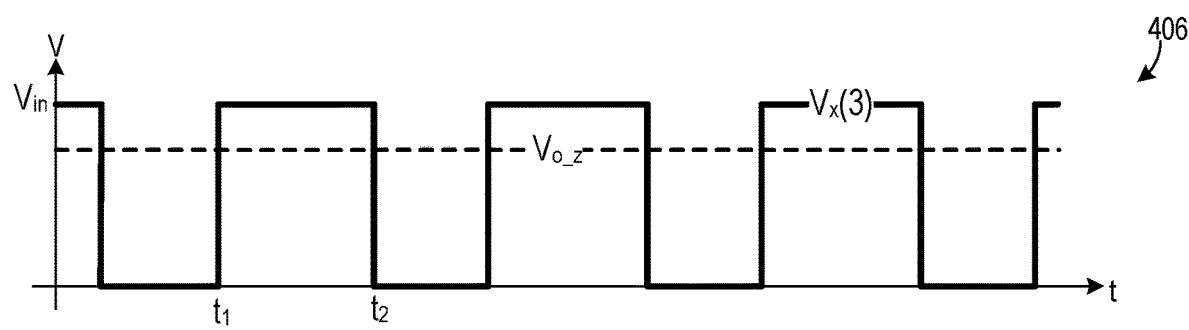
Figure 4D:
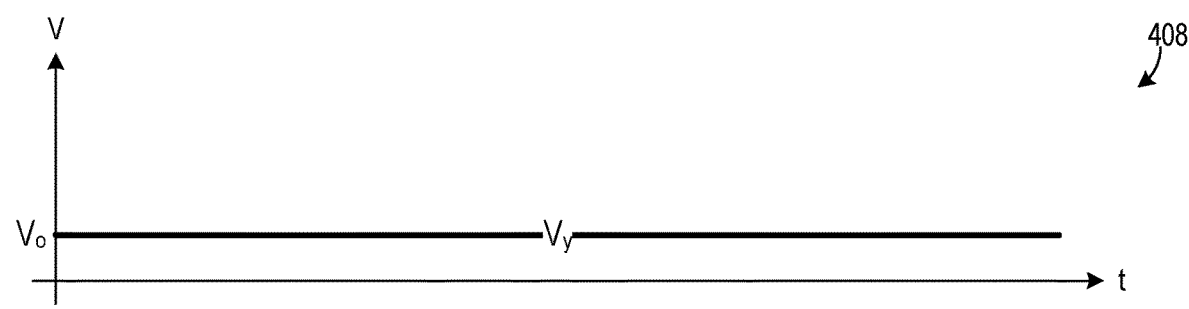

Graph 402 is a graph of switching node voltage $V_x(1)$ versus time, and graph 404 is a graph of switching node voltage $V_x(2)$ versus time. As illustrated in FIGS. 4A and 4B, each switching node X(1) and X(2) is repeatedly driven high and low between $V_{in\_a}$nd zero volts, respectively, and the switching nodes are driven high and low out-of-phase with each other. FIG. 4C is a graph 406 including a curve representing voltage at the injection switching node X(N+1), which is node X(3) because N is equal to two in this example. FIG. 4C also includes a curve representing voltage $V_{o\_z}$ at injection output node 122. FIG. 4D is a graph 408 of intermediate voltages $V_y$ between primary windings P of ideal transformers 310 and leakage inductances $L_k$ (see FIG. 3 for intermediate voltages $V_y$). Each intermediate voltage $V_y$ has essentially a constant value assuming the magnetizing inductance value of each power transformer 110 is very large relative to its leakage inductance values and the inductance of tuning inductor 130.

In the example of FIGS. 4A-4D, controller 106 controls injection stage 104 so that injection stage 104 switches in a manner which compensates for primary windings P of power transformers 110 being driven low. Specifically, primary winding P of injection transformer 120 is driven high in response to the primary winding P of any power transformer 110 being driven low, and primary winding P of injection transformer 120 is driven low in response to the primary winding of any power transformer 110 being driven high, as illustrated in FIGS. 4A-4C. For example, primary winding P of injection transformer 120 is driven high at time $t_1$ in response to primary winding P of power transformer 110(1) being driven low, and primary winding P of injection transformer 120 is driven low at time $t_2$ in response to primary winding P of power transformer 110(2) being driven high. Consequently, intermediate voltages $V_y$ remain essentially constant at the value of $V_o$, as shown in FIG. 4D. As a result, voltages on both sides of each leakage inductance $L_k$ are essentially identical, i.e., voltage at each side of each leakage inductance $L_k$ is essentially equal to $V_o$. For example, referring to FIG. 3, voltage $V_y(1)$ is essentially equal to $V_o$, and voltage at output node 112 is also equal $V_o$. Therefore, voltages $V_L$ across leakage inductances $L_k$ remain essentially at zero even as primary windings P of power transformers 110 are repeatedly driven between high and low states to regulate one or more parameters of switching power converter 100. As a result, there is no material ripple current associated with leakage inductances $L_k$, irrespective of operating duty cycle of switching power converter 100. It should be noted that there will be ripple current associated with charging and discharging magnetizing inductances $L_m$. However, such ripple current magnitude will be small if magnetizing inductances $L_m$ are large. Additionally, increasing magnetizing inductance $L_m$ does not degrade transient response.

The example of FIGS. 4A-4D assumes essentially ideal magnetic coupling of the primary and secondary windings of each transformer 110 and 120, i.e., that the magnetizing inductance value is much greater than any leakage inductance value of the transformer. Such assumption may not hold true in practical implementations, and voltages $V_L$ will therefore not necessarily be zero in practical implementations. For example, magnetizing inductance of power transformers 110 will typically be limited in practical applications to prevent magnetic saturation of power transformers 110, especially in view of the requirement that primary windings P of power transformers 110 collectively carry the entire output current $I_o$. Nevertheless, injection stage 104 may significantly reduce voltages $V_L$, such that injection stage 104 may significantly reduce ripple current magnitude, even if smaller than ideal magnetizing inductance of power transformers 110 prevents injection stage 104 from completely eliminating ripple current associated with leakage inductances $L_k$. Additionally, FIGS. 4A-4D assume ideal timing, i.e., that injection stage 104 switches in synchronicity with power stages 102. While such synchronicity may be desired, it is not required for acceptable operation of switching power converter 100.

The example of FIGS. 4A-4D assumes that power stages 102 are driven high in a non-overlapping manner, or in other words, that no more than one power stage 102 is driven high at any given time. However, switching power converter 100 is not limited to non-overlapping operation. For example, FIGS. 5A-5F are graphs collectively illustrating one example of operation of an embodiment of switching power converter 100 where N is equal to four, such that switching power converter 100 includes four power stages 102 and one injection stage 104. Graphs 5A-5F also assume that the magnetizing inductance value of each transformer 110 and 120 is much greater than any leakage inductance value of the transformer and the inductance of tuning inductor 130. Graph 502 is a graph of switching node voltage $V_x(1)$ versus time, graph 504 is a graph of switching node voltage $V_x(2)$ versus time, graph 506 is a graph of switching node voltage $V_x(3)$ versus time, and graph 508 is a graph of switching node voltage $V_x(4)$ versus time. As illustrated in FIGS. 5A-5D, each switching node X(1), X(2), X(3), and X(4) is repeatedly driven high and low between $V_{in\_a}$ and zero volts, and the switching nodes are driven high and low out-of-phase with each other. FIG. 5E is a graph 510 including a curve representing voltage at the injection switching node X(N+1), which is node X(5) because N is equal to four in this example. FIG. 5E also includes a curve representing voltage $V_{o\_z}$ at injection output node 122. FIG. 5F is a graph 512 of intermediate voltages $V_y$ between primary windings P of ideal transformers 310 and leakage inductances $L_k$. Each intermediate voltage $V_y$ has essentially a constant value due to the magnetizing inductance value of each transformer 110 and 120 being very large relative to the leakage inductance values of the transformers.

Figure 5A:
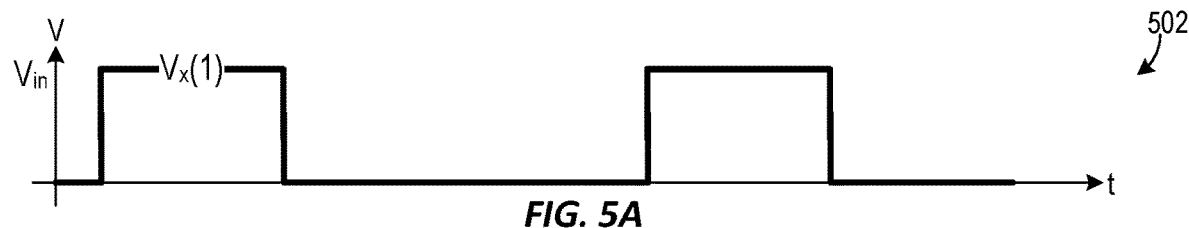
FIGS. 5A-5F are graphs illustrating one example of operation of an embodiment of the FIG. 1 switching power converter including four power stages.
Figure 5B:
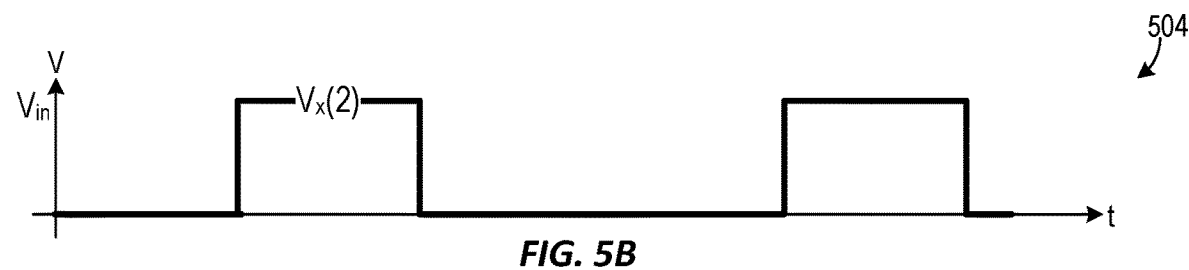
Figure 5C:
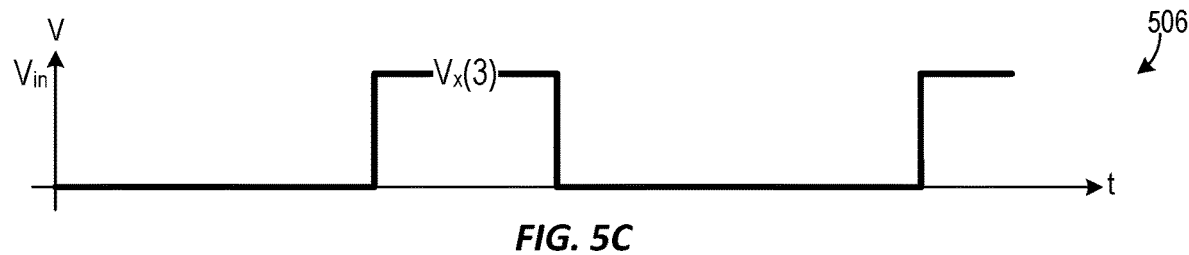
Figure 5D:
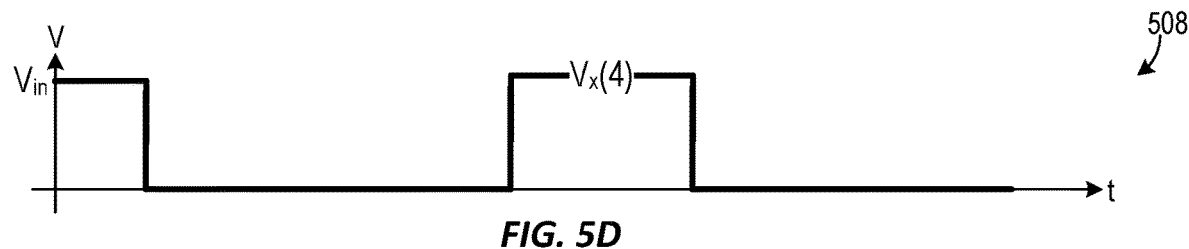
Figure 5E:
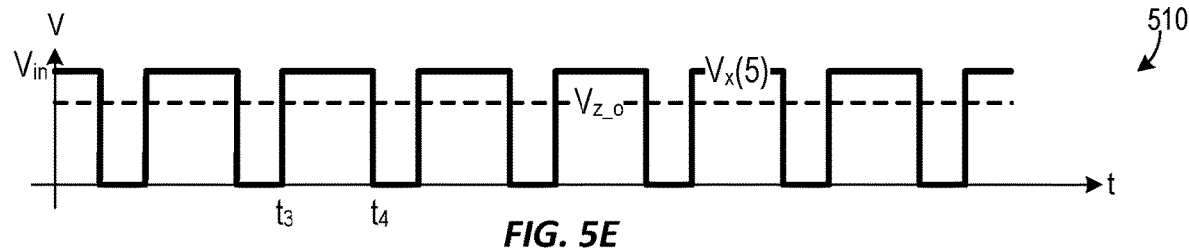
Figure 5F:
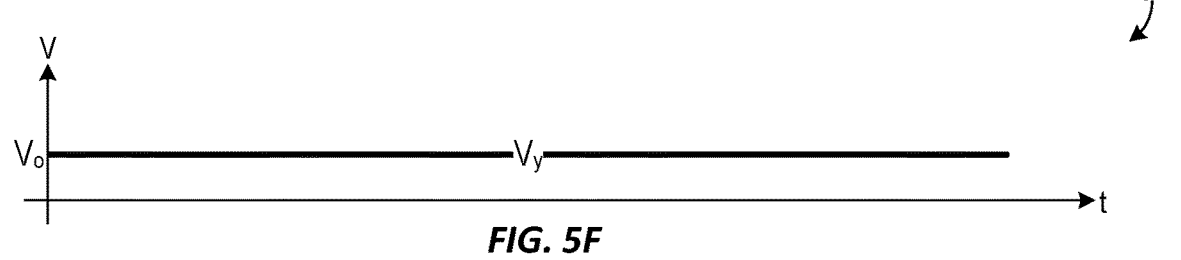

As evident from FIGS. 5A and 5D, the switching node X(1)-X(4) voltages overlap in that two switching nodes may be driven high at the same time. Accordingly, controller 106 controls injection stage 104 so that injection stage 104 switches in a manner which compensates for a primary winding P one power transformer 110 being driven low while a primary winding of another power transformer 110 is driven high, thereby preventing change in intermediate node voltages $V_y$. For example, primary winding P of injection transformer 120 is driven high at time $t_3$ in response to primary winding P of power transformer 110(1) being driven low while primary winding P of power transformer 110(2) is driven high, and primary winding P of injection transformer 120 is driven low at time $t_4$ in response to primary winding P of power transformer 110(3) being driven high. Accordingly, primary winding P of injection transformer 120 is driven high whenever the primary winding P of only one power transformer 110 is driven high, and the primary winding P of injection transformer 120 is driven low whenever primary windings P of two power transformers 110 are driven high. Consequently, intermediate voltages $V_y$ remain essentially constant at the value of $V_o$, as shown in FIG. 5F. Therefore, voltages $V_L$ across leakage inductances $L_k$ remain essentially at zero even as primary windings P of power transformers 110 are repeatedly driven been high and low states to regulate one or more parameters of switching power converter 100. As a result, there is no material ripple current associated with leakage inductances $L_k$, irrespective of operating duty cycle of switching power converter 100.

Similar to the example of FIGS. 4A-4D, the example of FIGS. 5A-5F assumes essentially ideal magnetic coupling of the primary and secondary windings of each transformer 110 and 120. However, injection stage 104 may significantly reduce ripple current magnitude even if non-ideal coupling of transformers 110 and 120 prevents injection stage 104 from completely eliminating ripple current associated with leakage inductances $L_k$. Additionally, while FIGS. 5A-5F assume ideal timing, i.e., that injection stage 104 switches in synchronicity with power stages 102, timing may vary while still achieving acceptable operation of switching power converter 100.

As FIGS. 5A-5F show, the switching node X(1)-X(4) voltages overlap in that two switching nodes may be driven high at the same time. Additionally, switching power converter 100 could be configured with enough phases and operated at a sufficiently large duty cycle so that voltages of three or more switching nodes X overlap in time. In other words, more than two switching nodes X can be driven high at the same time. In this case, injection stage 104 can still be controlled in such a way that it injects a pulse at the moment when one of power stages 102 is driven low, so the resulting $V_y$ voltages remain relatively constant and the voltages across the leakages remain close to zero.

Figure 6:
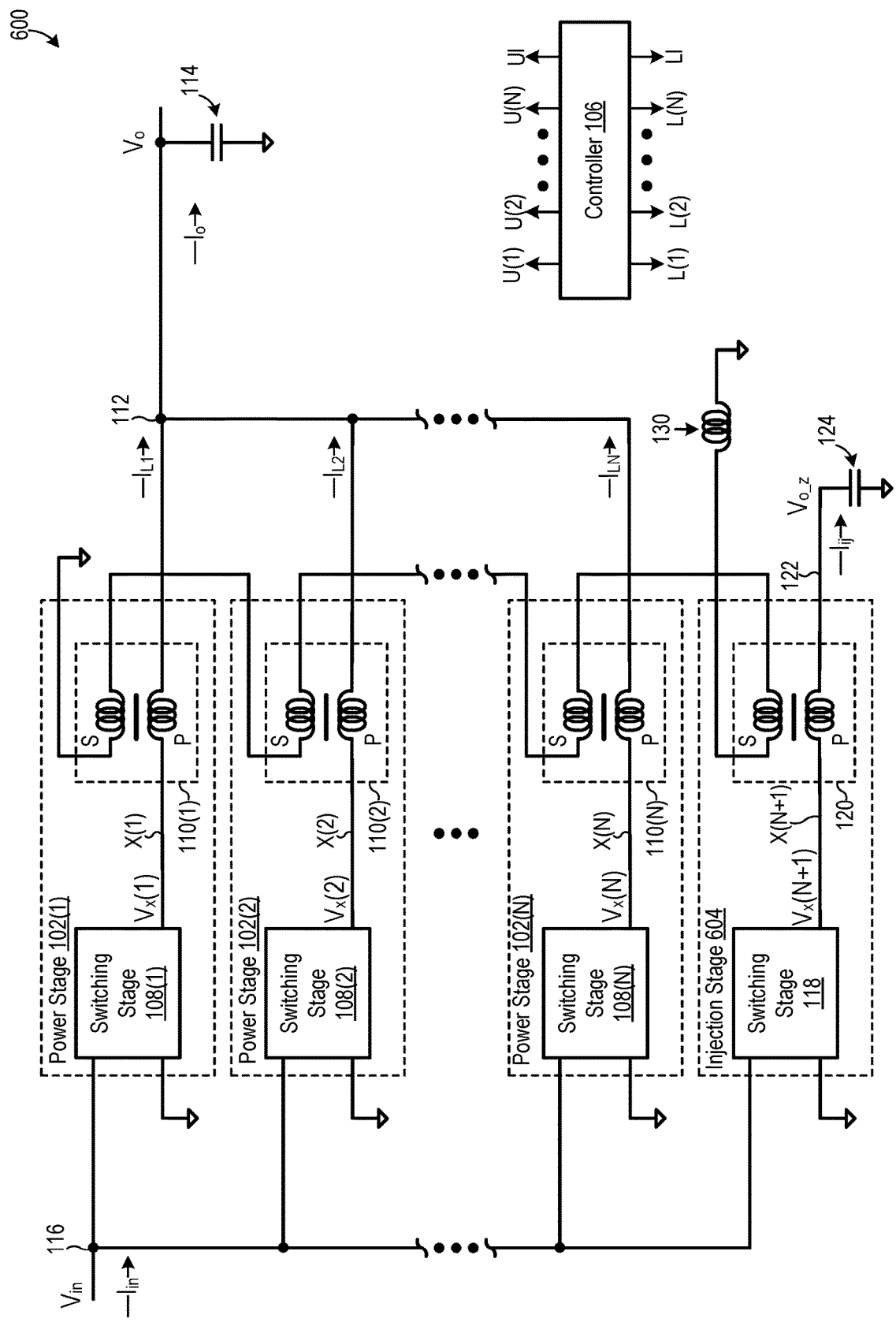
FIG. 6 is a schematic diagram of an alternate embodiment of the FIG. 2 switching power converter which includes an injection stage configured to compensate for a primary winding of a power transformer being driven high.

Referring again to FIG. 1, injection stage 104 is configured to compensate for a primary winding of a power transformer 110 being driven low, i.e., to inject magnetic flux into a magnetic core of a power transformer in a manner which prevents intermediate voltages $V_y$ from changing when a primary winding P of power transformer 110 is driven low. However, injection stage 104 could be modified to instead compensate for a primary winding of a power transformer 110 being driven high, i.e., to inject magnetic flux into a magnetic core of a power transformer 110 in a manner which prevents intermediate voltages $V_y$ from changing when the primary winding of power transformer 110 is driven high. For example, FIG. 6 is a schematic diagram of a switching power converter 600, which is an alternate embodiment of switching power converter 100 with injection stage 104 replaced with an injection stage 604. Injection stage 604 includes the same constituent elements as injection stage 104, but injection stage 604 is configured to compensate for a primary winding P of power transformer 110 being driven high, to prevent intermediate voltages $V_y$ from changing when the primary winding P is driven high.

Figure 7A:
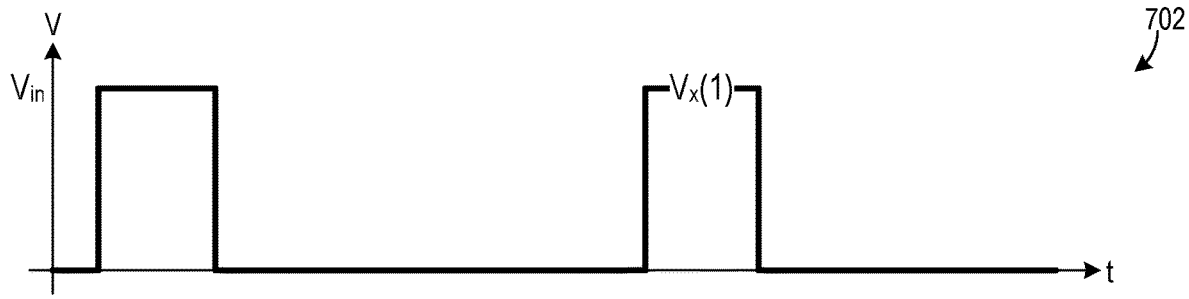
FIGS. 7A-7D are graphs illustrating one example of operation of an embodiment of the FIG. 6 switching power converter including two power stages.
Figure 7B:
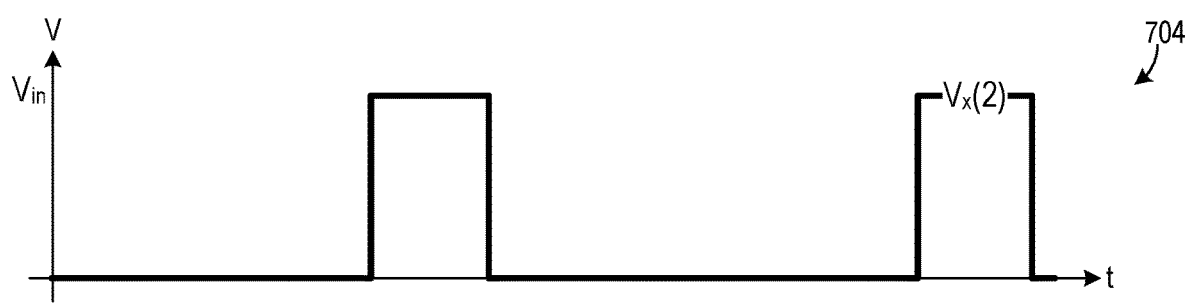
Figure 7C:
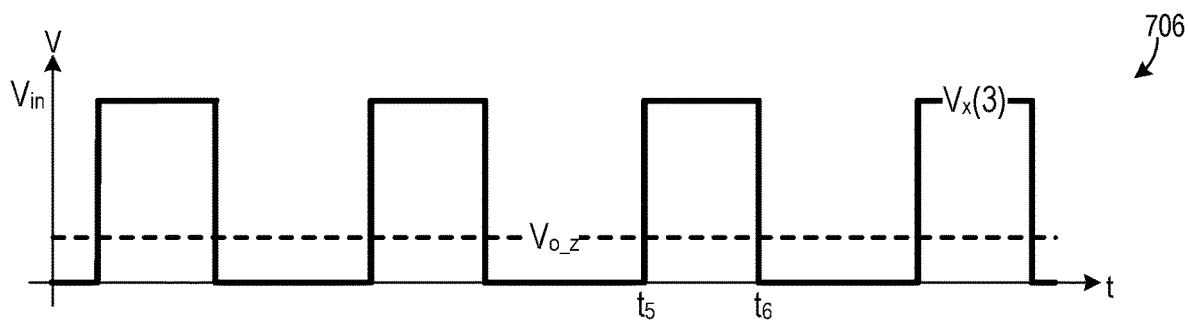
Figure 7D:
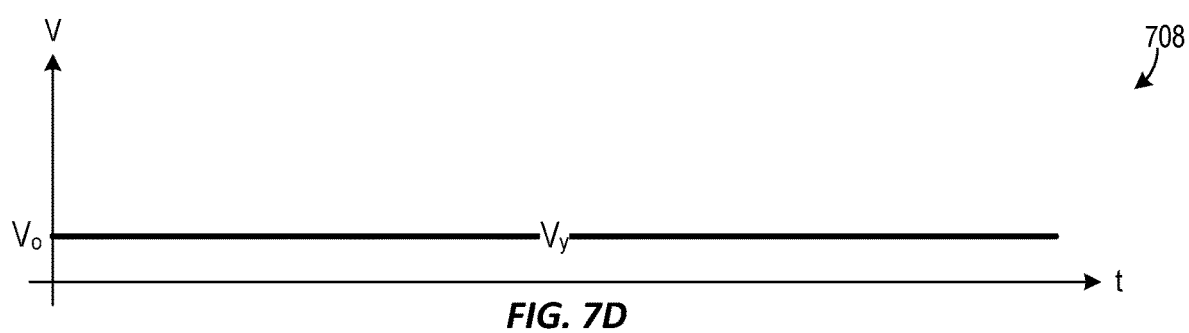

FIGS. 7A-7D are graphs collectively illustrating one example of operation of an embodiment of switching power converter 600 where N is equal to two, such that switching power converter 600 includes two power stages 102 and one injection stage 604. Graphs 7A-7D also assume that the magnetizing inductance value of each transformer 110 and 120 is much greater than any leakage inductance value of the transformer. Graph 702 is a graph of switching node voltage $V_x(1)$ versus time, and graph 704 is a graph of switching node voltage $V_x(2)$ versus time. FIG. 7C is a graph 706 including a curve representing voltage at the injection switching node X(N+1), which is node X(3) because N is equal to two in this example. FIG. 7C also includes a curve representing voltage $V_{o\_z}$ at injection output node 122. FIG. 7D is a graph 708 of intermediate voltages $V_y$ between primary windings P of ideal transformers 310 and leakage inductances $L_k$. Each intermediate voltage $V_y$ has essentially the same value due to the magnetizing inductance values of the transformers being very large relative to the leakage inductance values of the transformers.

In the example of FIGS. 7A-7D, controller 106 controls injection stage 604 so that injection stage 604 switches in a manner which compensates for primary windings P of power transformers 110 being driven high. Specifically, primary winding P of injection transformer 120 is driven high in response to a primary winding P of any power transformer 110 being driven high, and primary winding P of injection transformer 120 is driven low in response to a primary winding P of any power transformer 110 being driven low, as illustrated in FIGS. 7A-7C. For example, primary winding P of injection transformer 120 is driven high at time $t_5$ in response to primary winding P of power transformer 110(1) being driven high, and primary winding P of injection transformer 120 is driven low at time $t_6$ in response to primary winding P of power transformer 110(1) being driven low. Consequently, intermediate voltages $V_y$ remain essentially constant at the value of $V_o$, as shown in FIG. 7D. Therefore, voltages $V_L$ across leakage inductances $L_k$ remain essentially at zero even as primary windings of power transformers 110 are repeatedly driven between high and low states to regulate one or more parameters of switching power converter 600. As a result, there is no material ripple current associated with leakage inductance $L_k$, irrespective of operating duty cycle of switching power converter 600.

Similar to the example of FIGS. 4A-4D, the example of FIGS. 7A-7D assumes essentially ideal magnetic coupling of the windings of each transformer 110 and 120. However, injection stage 604 may significantly reduce ripple current magnitude even if non-ideal coupling of the transformers prevents injection stage 604 from completely eliminating ripple current associated with leakage inductances $L_k$. Additionally, while FIGS. 7A-7D assume ideal timing, i.e., that injection stage 604 switches in synchronicity with power stages 102, timing may vary while still achieving acceptable operation of switching power converter 600.

Referring again to FIG. 1, injection stage 104 is powered from input power node 116, and injection transformer 120 therefore has the same turns ratio as each power transformer 110. However, switching power converter 100 could be modified so that injection stage 104 is powered from a node having a voltage different from $V_{in}$ with appropriate changes to the turns ratio of injection transformer 120 and/or the turns ratio of each power transformer 110, to compensate for the difference in input voltage magnitude. In this document, a turns ratio of a transformer refers to ratio of quantity of primary winding turns to a quantity of secondary winding turns.

Figure 8:
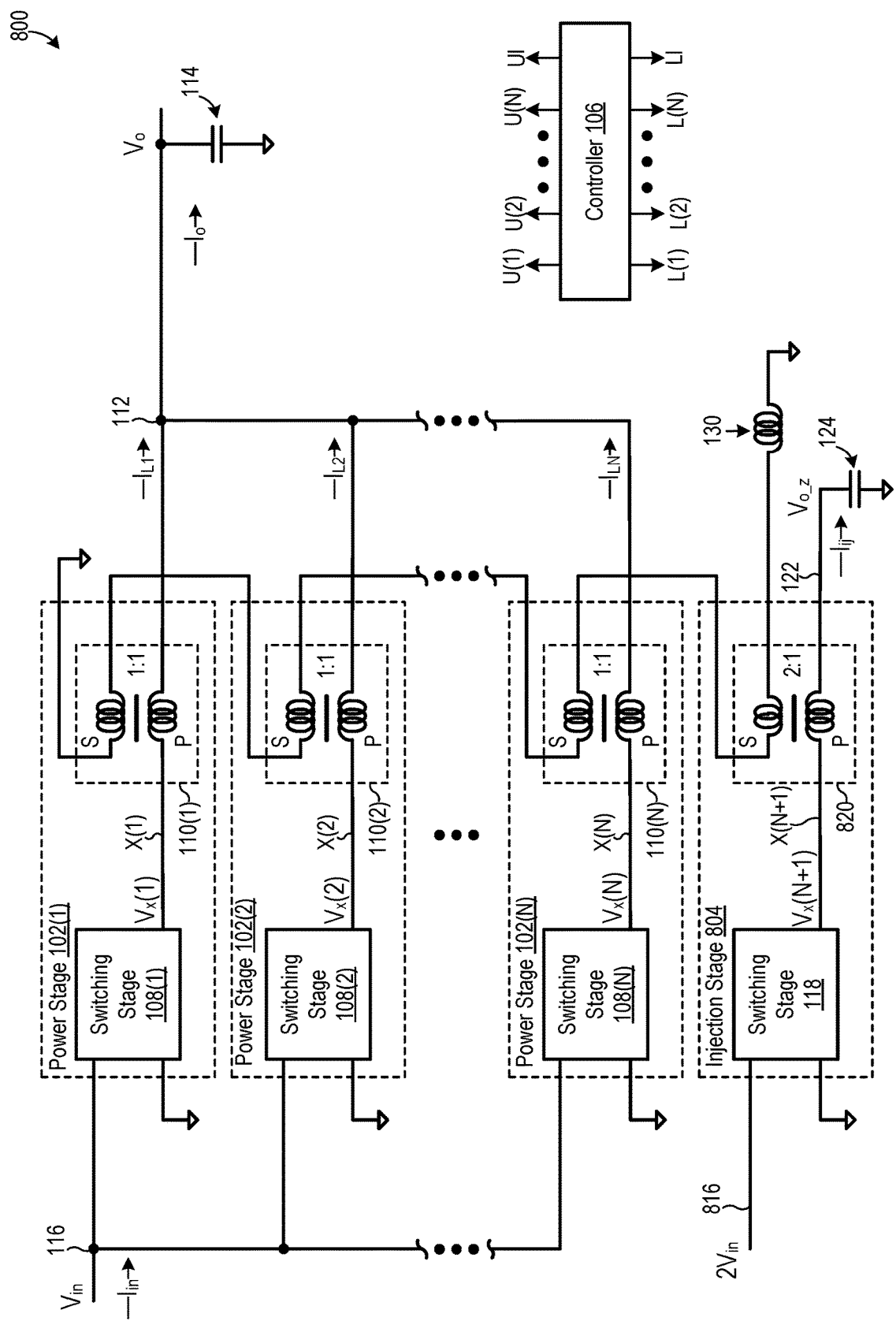
FIG. 8 is a schematic diagram of an alternate embodiment of the FIG. 1 switching power converter including an injection transformer having a different turns ratio that power transformers of the switching power converter.

For example, FIG. 8 is a schematic diagram of a switching power converter 800, which is an alternate embodiment of switching power converter 100 where injection stage 104 is replaced with an injection stage 804 powered from an input power rail 816. Input power rail 816 is at twice the voltage of input power rail 116, i.e., input power rail 816 is at voltage $2V_{in}$. Therefore, injection transformer 120 is replaced with an injection transformer 820 having twice the turns ratio as each power transformer 110, to compensate for the input voltage to injection stage 804 being twice the input voltage to each power transfer stage 102. For example, in some embodiments, injection transformer 820 has a turns ratio of 2:1, while each power transformer 110 has a turns ratio of 1:1, as illustrated in FIG. 8.

Figure 9A:
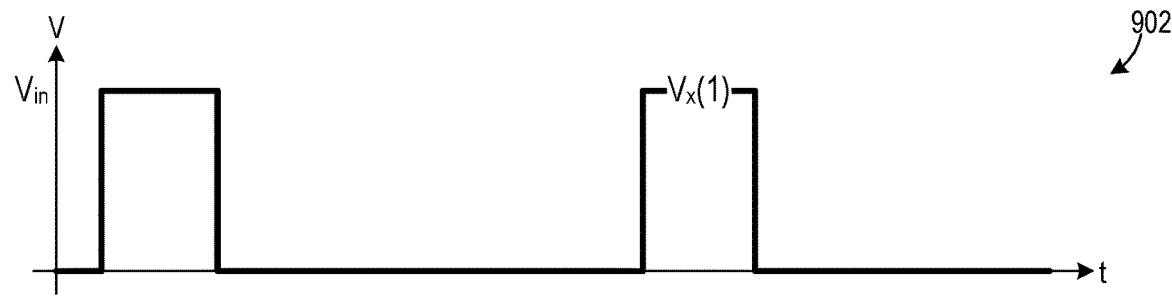
FIG. 9A-9D are graphs illustrating one example of operation of an embodiment of the FIG. 8 switching power converter including two power stages.
Figure 9B:
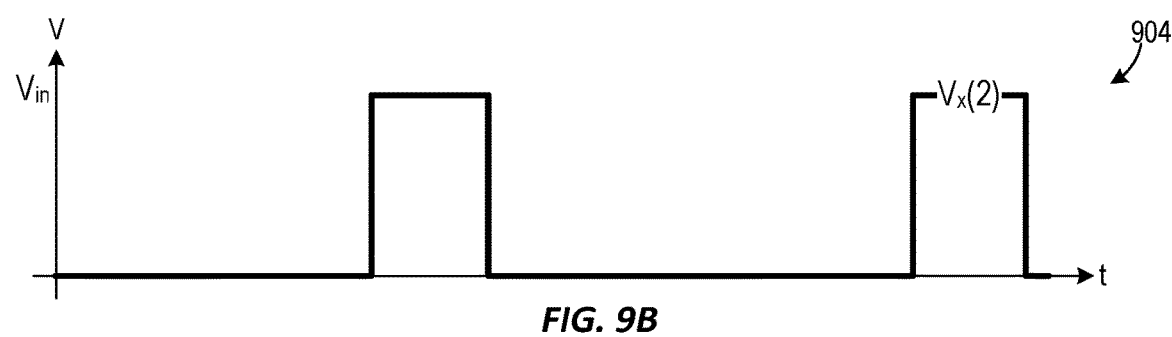
Figure 9C:
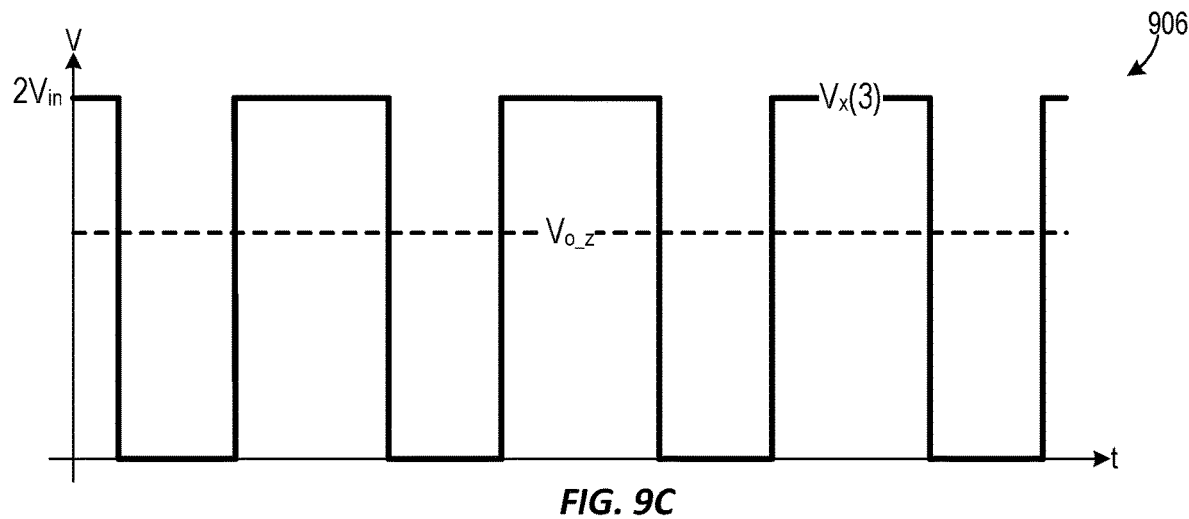
Figure 9D:
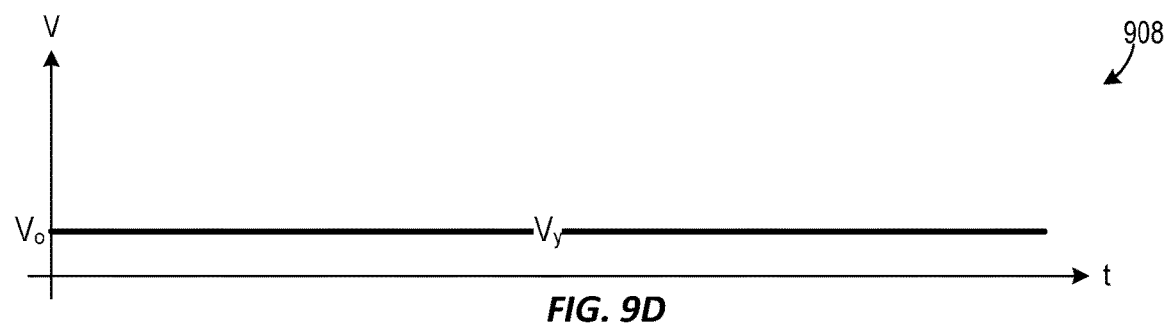

FIGS. 9A-9D are graphs collectively illustrating one example of operation of an embodiment of switching power converter 800 where N is equal to two, such that switching power converter 800 includes two power stages 102 and one injection stage 804. Graphs 9A-9D also assume that the magnetizing inductance value of each transformer 110 and 820 is much greater than any leakage inductance value of the transformer. Graph 902 is a graph of switching node voltage $V_x(1)$ versus time, and graph 904 is a graph of switching node voltage $V_x(2)$ versus time. FIG. 9C is a graph 906 including a curve representing voltage at the injection switching node X(N+1), which is node X(3) because N is equal to two in this example. FIG. 9C also includes a curve representing voltage $V_{o\_z}$ at injection output node 122. FIG. 9D is a graph 908 of intermediate voltages $V_y$ between primary windings P of ideal transformers 310 and leakage inductances $L_k$. Each intermediate voltage $V_y$ has essentially the same value due to the magnetizing inductance value of each transformer 110 and 820 being very large relative to the leakage inductance values.

In the example of FIGS. 9A-9D, controller 106 controls injection stage 804 so that injection stage 804 switches in a manner which compensates for primary windings of power transformers 110 being driven low. Specifically, primary winding P of injection transformer 820 is driven high in response to the primary winding P of any power transformer 110 being driven low, and primary winding P of injection transformer 820 is driven low in response to the primary winding any power transformer 110 being driven high, as illustrated in FIGS. 9A-9C. Although injection switching node $V_x(3)$ is driven to twice voltage $V_{in}$ instead of to voltage $V_{in}$, the fact that the turns ratio of injection transformer 820 is twice the turns ratio of each power transformer 110 compensates for this difference in input voltage. Consequently, intermediate voltages $V_y$ remain essentially constant at the value of $V_o$, as shown in FIG. 9D. Therefore, voltages $V_L$ across leakage inductances $L_k$ remain essentially at zero even as primary windings P of power transformers 110 are repeatedly driven between high and low states to regulate one or more parameters of switching power converter 800. As a result, there is no material ripple current associated with leakage inductance $L_k$, irrespective of operating duty cycle of switching power converter 800.

Similar to the example of FIGS. 4A-4D, the example of FIGS. 9A-9D assumes essentially ideal magnetic coupling of transformers 110 and 820. However, injection stage 804 may significantly reduce ripple current magnitude even if non-ideal coupling of the transformers prevents injection stage 804 from completely eliminating ripple current associated with leakage inductances $L_k$. Additionally, while FIGS. 9A-9D assume ideal timing, i.e., that injection stage 804 switches in synchronicity with power stages 102, timing may vary while still achieving acceptable operation of switching power converter 800.

Figure 10:
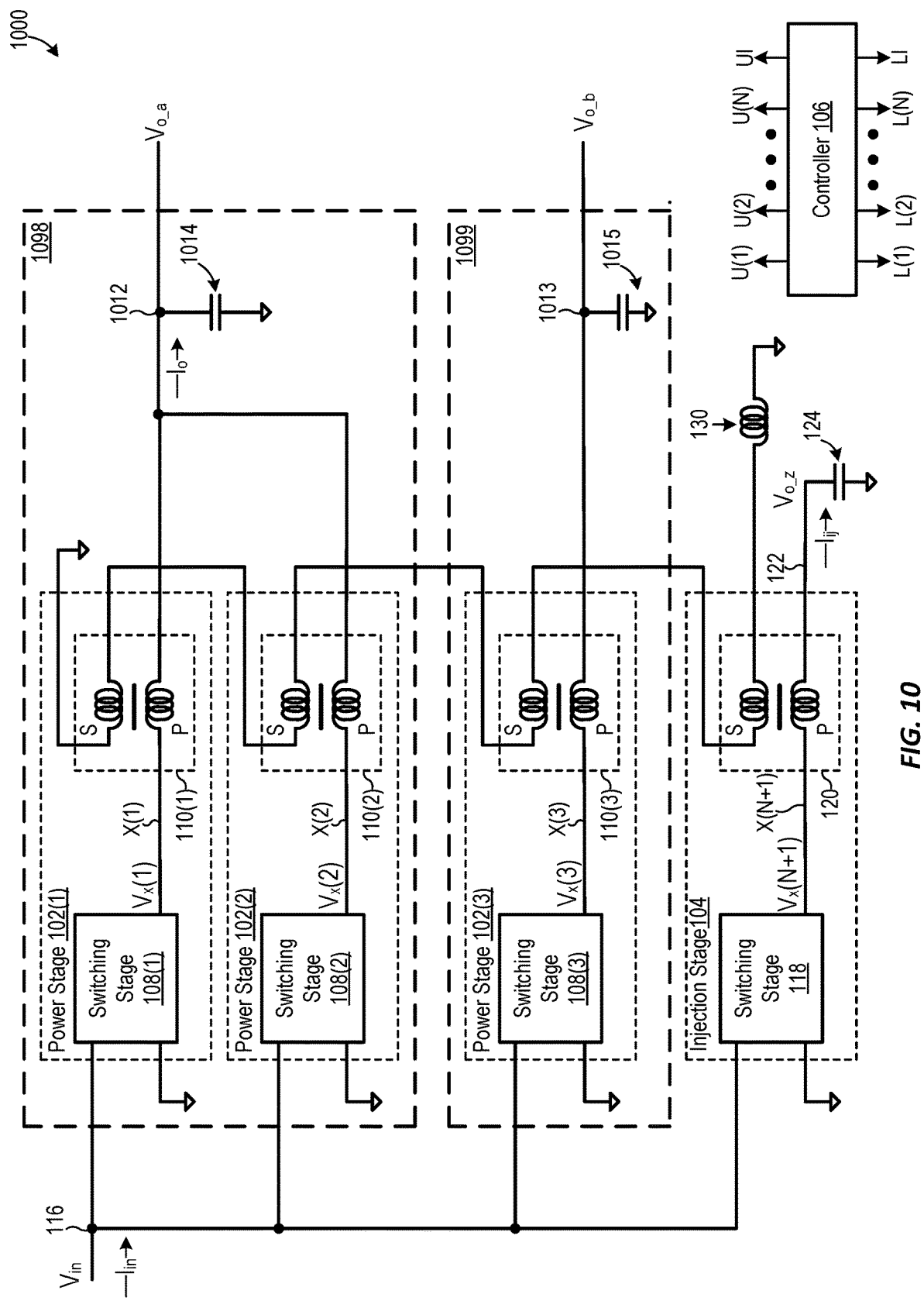
FIG. 10 is a schematic diagram of an alternate embodiment of the FIG. 1 switching power converter including two power sub-converters.

Any of the switching power converters disclosed herein could be modified so that at least two of the power stages are part of different respective power sub-converters. For example, FIG. 10 is a schematic diagram of a switching power converter 1000, which is an alternate embodiment of switching power converter 100 where N is equal to three and the switching power converter includes two power sub-converters 1098 and 1099. Power stages 102(1) and 102(2) are part of power sub-converter 1098, and each of these power stages is electrically coupled between input power node 116 and an output power node 1012 of power sub-converter 1098. Output power node 1012 is at a voltage $V_{o\_a}$, and one or more capacitors 1014 are optionally electrically coupled to output power node 1012. Power stage 102(3) is part of power sub-converter 1099, and the power stage is electrically coupled between input power node 116 and an output power node 1013 of power sub-converter 1099. Output power node 1013 is at a voltage $V_{o\_b}$, and one or more capacitors 1015 are optionally electrically coupled to output power node 1013.

Figure 11A:
FIGS. 11A-11D are graphs illustrating one example of operation of an embodiment of the FIG. 10 switching power converter.
Figure 11B:
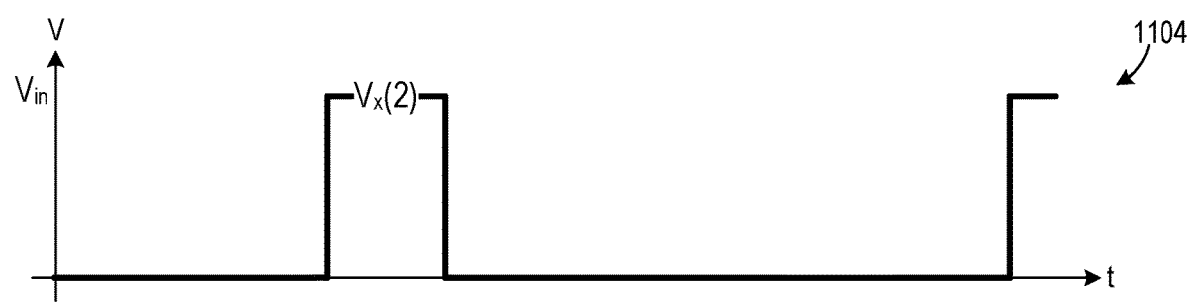
Figure 11C:
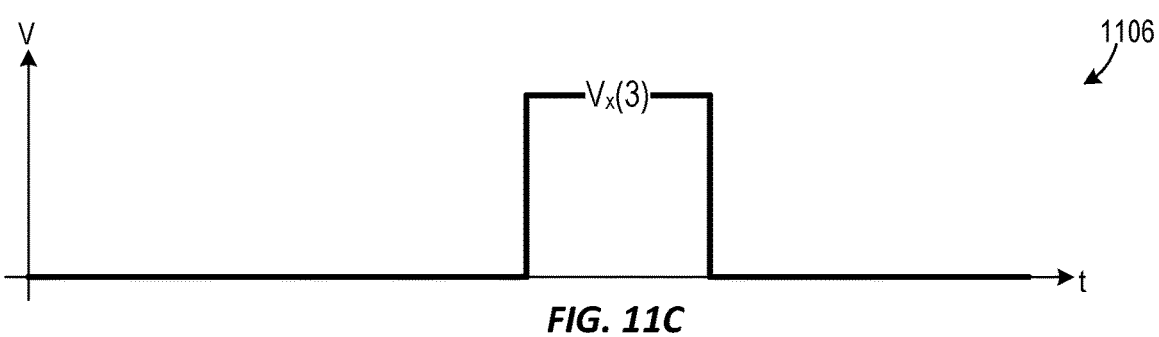
Figure 11D:
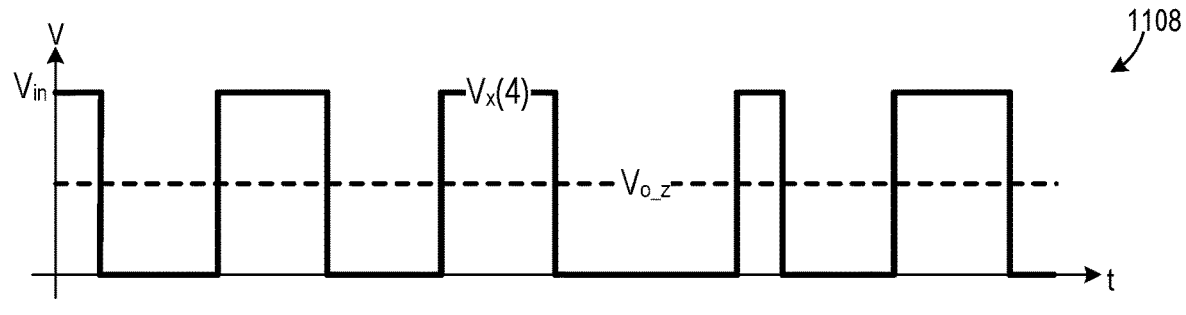

FIGS. 11A-11D are graphs collectively illustrating one example of operation of an embodiment of switching power converter 1000. Graphs 11A-11D assume that the magnetizing inductance value of each transformer 110 and 120 is much greater than any leakage inductance value of the transformers. Graph 1102 is a graph of switching node voltage $V_x(1)$ versus time, graph 1104 is a graph of switching node voltage $V_x(2)$ versus time, and graph 1106 is a graph of switching node voltage $V_x(3)$ versus time. FIG. 11D is a graph 1108 including a curve representing voltage at the injection switching node X(N+1), which is node X(4) because N is equal to three in this example. FIG. 11D also includes a curve representing voltage $V_{o\_z}$ at injection output node 122. In this example, controller 106 controls injection stage 104 so that injection stage 104 switches in a manner which compensates for primary windings P of power transformers 110 being driven low. Specifically, primary winding P of injection transformer 120 is driven high in response to the primary winding P any power transformer 110 being driven low, and primary winding P of injection winding 120 is driven low in response to the primary winding P of any power transformer 110 being driven high, as illustrated in FIGS. 11A-11C. Consequently, voltages $V_L$ across leakage inductances $L_k$ remain essentially at zero even as primary windings P of power transformers 110 are repeatedly driven between high and low states to regulate one or more parameters of switching power converter 1000. As a result, there is no material ripple current associated with leakage inductance $L_k$, irrespective of operating duty cycle of switching power converter 1000.

Similar to the example of FIGS. 4A-4D, the example of FIGS. 11A-11D assumes essentially ideal magnetic coupling of transformers 110 and 120. However, injection stage 104 may significantly reduce ripple current magnitude even if non-ideal coupling of transformers 110 and 120 prevents injection stage 104 from completely eliminating ripple current associated with leakage inductances $L_k$. Additionally, while FIGS. 11A-11D assume ideal timing, i.e., that injection stage 104 switches in synchronicity with power stages 102, timing may vary while still achieving acceptable operation of switching power converter 1000.

Switching power converter 1000 could be modified so that injection stage 104 compensates for a primary winding of a power transformer 110 being driven high, instead of compensating for a primary winding of a power transformer 110 being driven low, such as in a manner analogous to that discussed above with respect to FIGS. 6 and 7. Furthermore, switching power converter 1000 could be modified to include a different number of power stages 102, a different number of power sub-converters, and/or a different distribution of power stages 102 among power sub-converters. Additionally, two or more power sub-converters could be daisy chained, i.e., an output of one power sub-converter could be an input of another power sub-converter. The power sub-converters could also be of a different type, for example a buck power sub-converter could be coupled with a boost power sub-converter, etc. Furthermore, two or more power sub-converters could be powered from different input power nodes.

Figure 12:
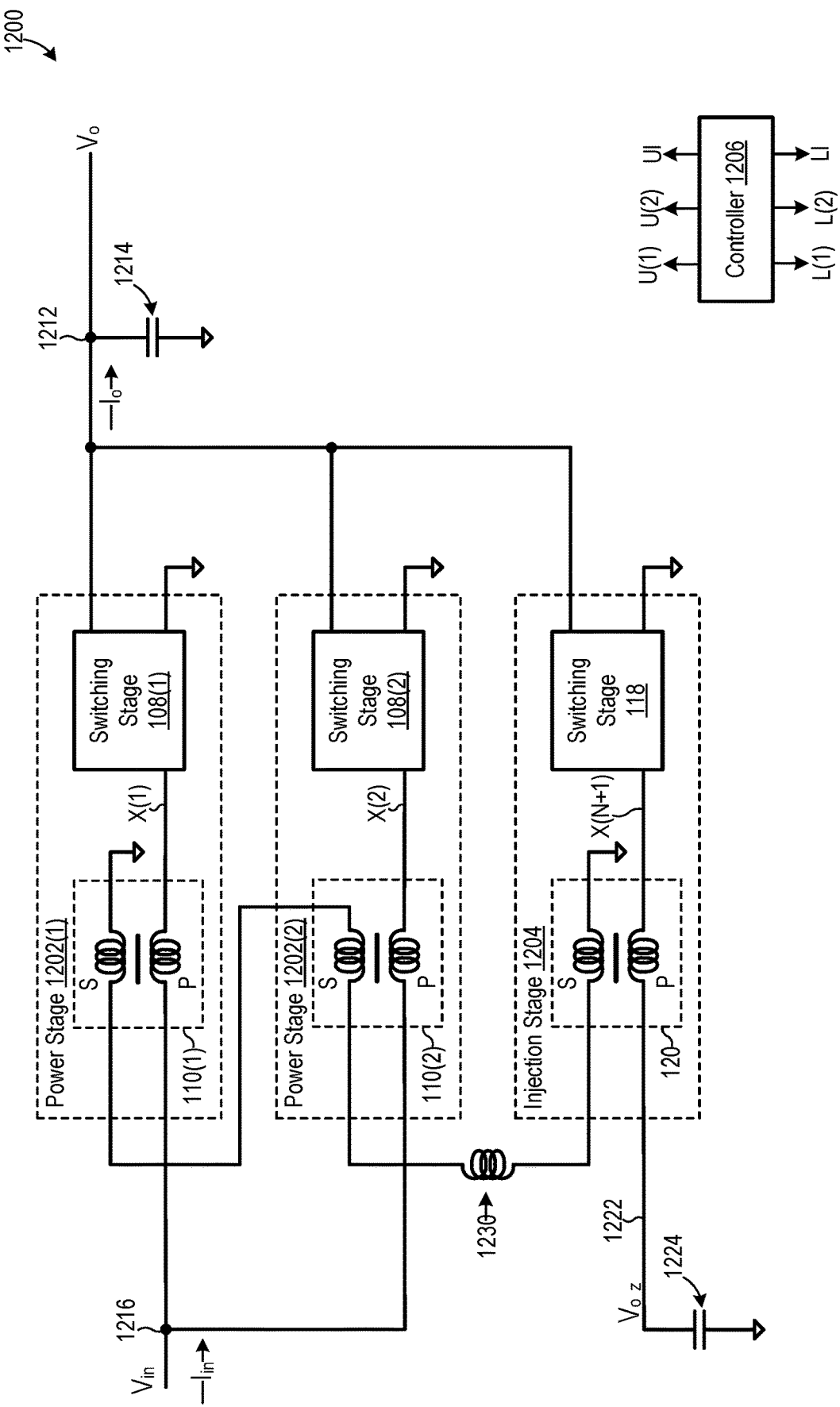
FIG. 12 is a schematic diagram of an alternate embodiment of the FIG. 1 switching power converter having a multi-phase boost-type topology.

The example switching power converters discussed above have a multi-phase buck-type topology. However, the new switching power converters including transformers and injection stages are not limited to a buck-type topology. For example, FIG. 12 is a schematic diagram of a switching power converter 1200, which is an alternate embodiment of switching power converter 100 having a multi-phase boost-type topology, where N is equal to two. Power stages 102 of switching power converter 100 are replaced with power stages 1202 in switching power converter 1200. Power stages 1202 include the same constituent elements as power stages 102, but with the elements configured in a different topology. Specifically, the primary winding P of each power transformer 110 is electrically coupled between an input power node 1216 and a switching node X of the respective power stage 1202. The upper and lower switching devices of each power switching stage 108, e.g., switching devices 206 and 208 of FIG. 2, are electrically coupled in series between an output power node 1212 and ground. Accordingly, each power switching stage 108 is configured to repeatedly switch its respective switching node X between a voltage $V_o$ of output power node 1212 and ground. A primary winding P of a given power transformer 110 in switching power converter 1200 is driven high when its respective switching node X is at voltage $V_o$, and the primary winding P of the power transformer 110 is driven low when its respective switching node X is at zero volts relative to ground. For example, primary winding P of power transformer 110(1) is driven high when switching node X(1) is at voltage $V_o$, and primary winding P of power transfer winding 110(1) is driven low when switching node X(1) is at zero volts relative to ground. One or more capacitors 1214 are optionally electrically coupled to output power node 1212.

Injection stage 104 of switching power converter 100 is replaced with an injection stage 1204 in switching power converter 1200. Injection stage 1204 includes the same constituent elements as injection stage 104 but with a different topology. Primary winding P of injection transformer 120 is electrically coupled between injection switching node X(3) and an injection output node 1222, and a capacitor 1224 is electrically coupled to injection output node 1222. The upper and lower switching devices of injection switching stage 118, e.g., switching devices 210 and 212 of FIG. 2, are electrically coupled in series between output power node 1212 and ground. Accordingly, injection switching stage 118 is configured to repeatedly switch switching node X(3) between voltage $V_o$ and ground. Primary winding P of injection transformer 120 in switching power converter 1200 is driven high when switching node X(3) is at voltage $V_o$, and primary winding P of injection transformer 120 is driven low when switching node X(3) is at zero volts relative to ground.

Secondary windings S of power transformers 110, as well as secondary winding S of injection transformer 120, are electrically coupled in series with each other. While FIG. 12 depicts the series connections of secondary windings S being partially embodied by a ground node, secondary windings S could be isolated from ground, as long as they are electrically coupled in series. An optional tuning inductor 1230 is electrically coupled in series with secondary windings S of power transformers 110, as well as with secondary winding S of injection transformer 120. The topological location of tuning inductor 1230 could vary as long as it is electrically coupled in series with secondary windings S. While tuning inductor 1230 is depicted as being a discrete inductor, tuning inductor 1230 could instead be embodied by intrinsic inductance of a circuit including secondary windings S, particularly in applications where tuning inductor 1230 need only have a small inductance value. Furthermore, tuning inductor 1230 could be omitted, or tuning inductor 1230 could be replaced with a plurality of tuning inductors, without departing from the scope hereof.

Controller 1206, which is an embodiment of controller 106, is configured to generate control signals U and L to control duty cycle of power stages 1202 to regulate at least one parameter of switching power converter 1200. Examples of possible regulated parameters include, but are not limited, magnitude of input voltage $V_{in}$, magnitude of input current $I_{in}$, magnitude of output voltage $V_o$, and magnitude of output current $I_o$. Controller 1206 is optionally configured to generate control signals U and L such that power stages 1202 switch out-of-phase with each other. Controller 1206 is further configured to generate control signals UI and LI to control injection stage 1204 such that the injection stage injects magnetic flux in magnetic cores of power transformers 110 in a manner which reduces voltage across leakage inductance of each power transformer 110, such as by compensating for a primary winding P of a power transformer 110 being driven high or by compensating for a primary winding P of a power transformer 110 being driven low.

Figure 13A:
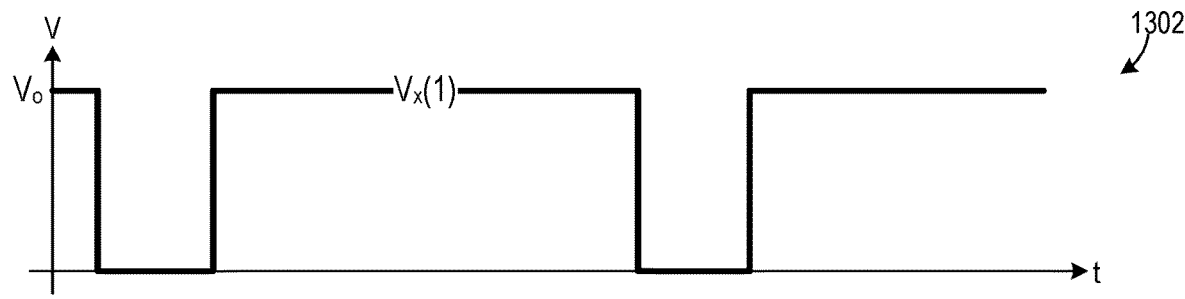
FIGS. 13A-13D are graphs illustrating one example of operation of an embodiment of the FIG. 12 switching power converter.
Figure 13B:
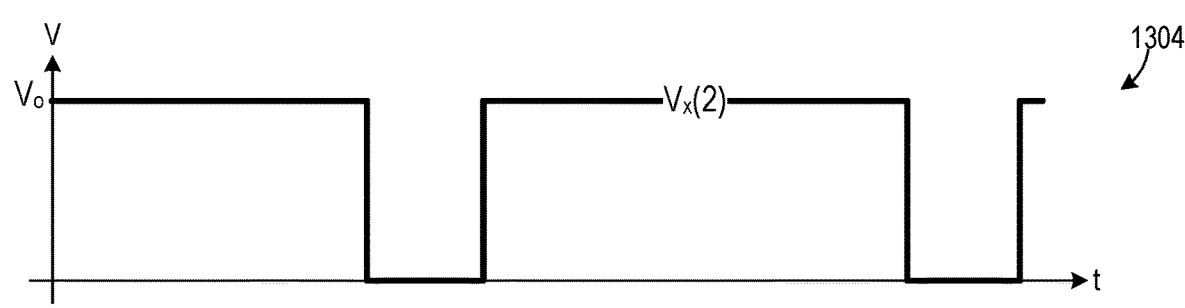
Figure 13C:
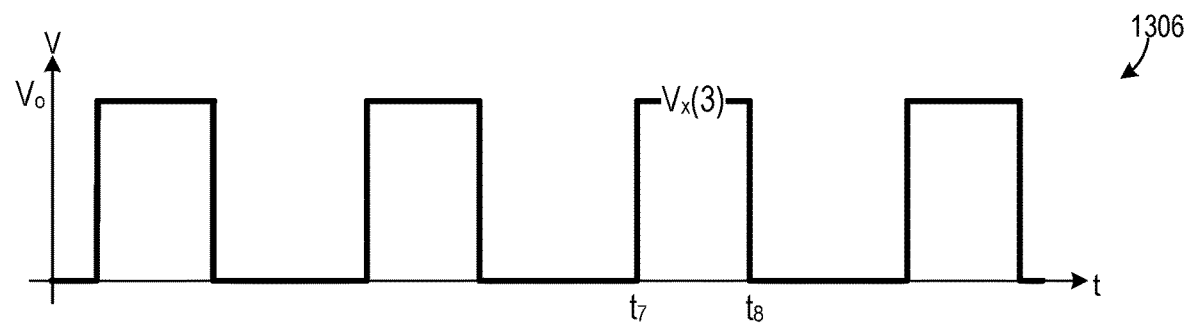
Figure 13D:
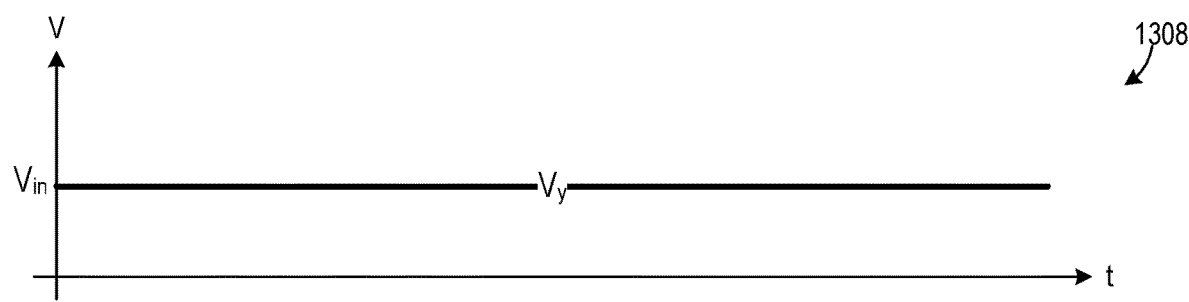

For example, FIGS. 13A-13D are graphs collectively illustrating one example of operation of an embodiment of switching power converter 1200. Graphs 13A-13D assume that the magnetizing inductance value of each transformer 110 and 120 is much greater than any leakage inductance value of the transformers. Graph 1302 is a graph of switching node voltage $V_x(1)$ versus time, and graph 1304 is a graph of switching node voltage $V_x(2)$ versus time. FIG. 13C is a graph 1306 including a curve representing voltage at the injection switching node X(3). FIG. 13D is a graph 1308 of intermediate voltages $V_y$ between primary windings P of ideal transformers 310 and leakage inductances $L_k$. Each intermediate voltage $V_y$ has essentially the same value due to the magnetizing inductance value of each power transformer being very large relative to the leakage inductance values of each power transformer and the inductance of tuning inductor 1230.

In the example of FIGS. 13A-13D, controller 1206 controls injection stage 1204 so that injection stage 1204 switches in a manner which compensates for primary windings P of power transformers 110 being driven low. Specifically, primary winding P of injection transformer 120 is driven high in response to the primary winding P of any power transformer 110 being driven low, and primary winding P of injection transformer 120 is driven low in response to the primary winding P of any power transformer 110 being driven high, as illustrated in FIGS. 13A-13C. For example, primary winding P of injection transformer 120 is driven high at time $t_7$ in response to primary winding P of power transformer 110(1) being driven low, and primary winding P of injection transformer 120 is driven low at time $t_8$ in response to primary winding P of power transformer 110(1) being driven high. Consequently, intermediate voltages $V_y$ remain essentially constant at the value of $V_{in}$, as shown in FIG. 13D. Therefore, voltages $V_L$ across leakage inductances $L_k$ remain essentially at zero even as primary windings P of power transformers 110 are repeatedly driven between high and low states to regulate one or more parameters of switching power converter 1200. As a result, there is no material ripple current associated with leakage inductance $L_k$, irrespective of operating duty cycle of switching power converter 1200.

Similar to the example of FIGS. 4A-4D, the example of FIGS. 13A-13D assumes essentially ideal magnetic coupling of transformers 110 and 120. However, injection stage 1204 may significantly reduce ripple current magnitude even if non-ideal coupling of transformers 110 and 120 prevents injection stage 1204 from completely eliminating ripple current associated with leakage inductances $L_k$. Additionally, while FIGS. 13A-13D assume ideal timing, i.e., that injection stage 1204 switches in synchronicity with power stages 1202, timing may vary while still achieving acceptable operation of switching power converter 1200.

Figure 14:
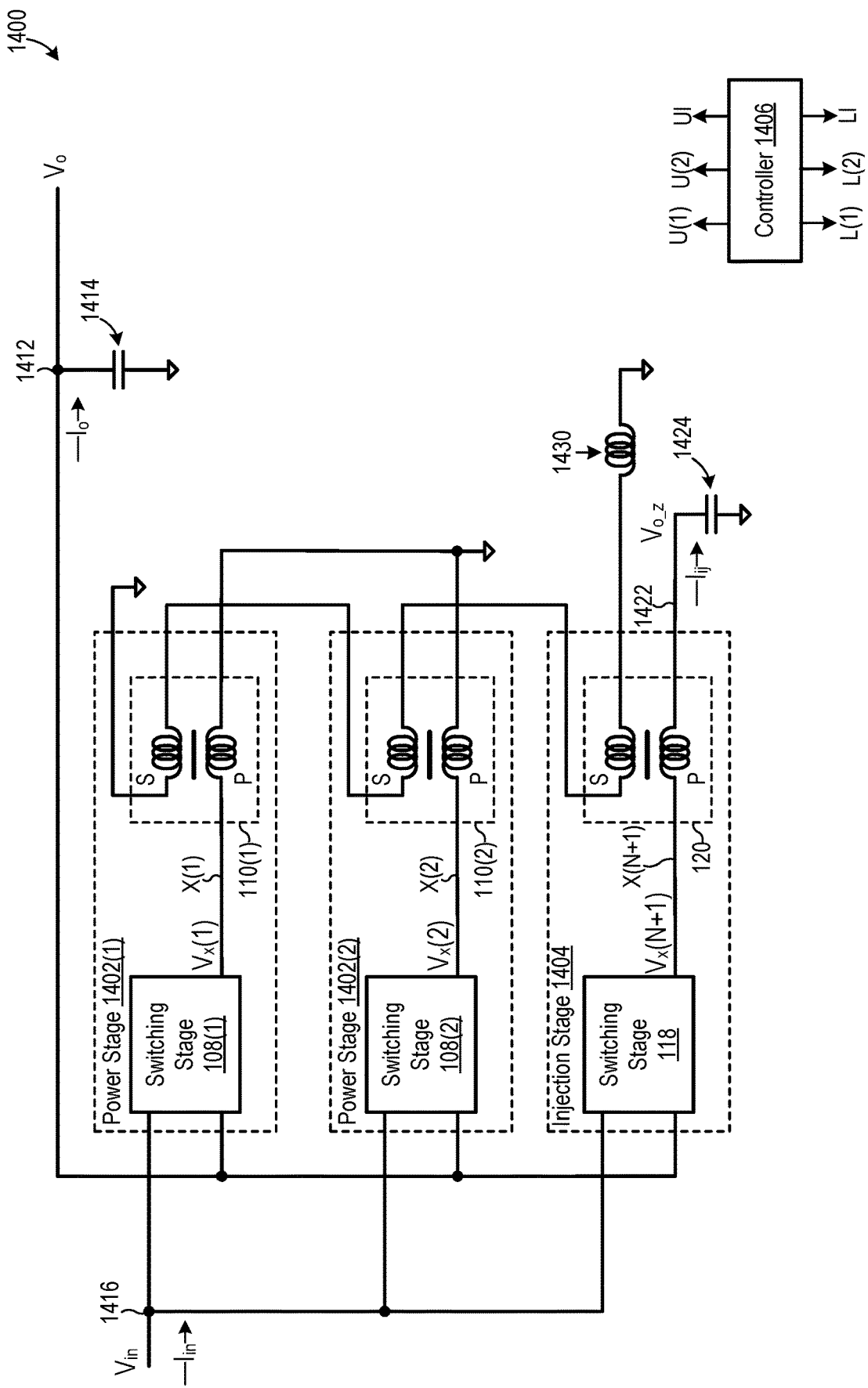
FIG. 14 is a schematic diagram of an alternate embodiment of the FIG. 1 switching power converter having a multi-phase buck-boost-type topology.

FIG. 14 is a schematic diagram of a switching power converter 1400, which is an alternate embodiment of switching power converter 100 having a multi-phase buck-boost-type topology, where N is equal to two. Power stages 102 of converter 100 are replaced with power stages 1402 in switching power converter 1400. Power stages 1402 include the same constituent elements as power stages 102, but with the elements configured in a different topology. Specifically, each the primary winding P of power transformer 110 is electrically coupled between ground and a switching node X of the respective power stage 1402. The upper and lower switching devices of each power switching stage 108, e.g., switching devices 206 and 208 of FIG. 2, are electrically coupled in series between an input power node 1416 and an output power node 1412. Accordingly, each power switching stage 108 is configured to repeatedly switch its respective switching node X between a voltage $V_{in}$ of input power node 1416 a voltage $V_o$ of output power node 1412. A primary winding P of given power transformer 110 in switching power converter 1400 is driven high when its respective switching node X is at voltage $V_{in}$, and the primary winding P of the power transformer 110 is driven low when its respective switching node X is at voltage $V_o$. For example, primary winding P of power transformer 110(1) is driven high when switching node X(1) is at voltage $V_{in}$, and primary winding P of power transformer 110(1) is driven low when switching node X(1) is at voltage $V_o$. One or more capacitors 1414 are optionally electrically coupled to output power node 1412.

Injection stage 104 of converter 100 is replaced with an injection stage 1404 in switching power converter 1400. Injection stage 1404 includes the same constituent elements as injection stage 104 but with a different topology. Primary winding P of injection transformer 120 is electrically coupled between injection switching node X(3) and an injection output node 1422, and a capacitor 1424 is electrically coupled to injection output node 1422. The upper and lower switching devices of injection switching stage 118, e.g., switching devices 210 and 212 of FIG. 2, are electrically coupled in series between input power node 1416 and output power node 1412. Accordingly, injection switching stage 118 is configured to repeatedly switch switching node X(3) between voltage $V_{in}$ and $V_o$. Primary winding P of injection transformer 120 in switching power converter 1404 is driven high when switching node X(3) is at voltage $V_{in}$, and the primary winding P of injection transformer 120 is driven low when switching node X(3) is at voltage $V_o$.

Secondary windings S of power transformers 110, as well as secondary winding S of injection transformer 120, are electrically coupled in series with each other. While FIG. 14 depicts the series connections of secondary windings S being partially embodied by a ground node, secondary windings S could be isolated from ground, as long as they are electrically coupled in series. An optional tuning inductor 1430 is electrically coupled in series with secondary windings S of power transformers 110, as well as with secondary winding S of injection transformer 120. The topological location of tuning inductor 1430 could vary as long as it is electrically coupled in series with secondary windings S. While tuning inductor 1430 is depicted as being a discrete inductor, tuning inductor 1430 could instead be embodied by intrinsic inductance of a circuit including secondary windings S, particularly in applications where tuning inductor 1430 need only have a small inductance value. Furthermore, tuning inductor 1430 could be omitted, or tuning inductor 1430 could be replaced with a plurality of tuning inductors, without departing from the scope hereof.

Controller 1406, which is an embodiment of controller 106, is configured to generate control signals U and L to control duty cycle of power stages 1402 to regulate at least one parameter of switching power converter 1400. Examples of possible regulated parameters include, but are not limited, magnitude of input voltage $V_{in}$, magnitude of input current $I_{in}$, magnitude of output voltage $V_o$, and magnitude of output current $I_o$. Controller 1406 is optionally configured to generate control signals U and L such that power stages 1402 switch out-of-phase with each other. Controller 1406 is further configured to generate control signals UI and LI to control injection stage 1404 such that the injection stage injects magnetic flux into magnetic cores of power transformers 110 in a manner which reduces voltage across leakage inductance of each power transformer, such as by compensating for a primary winding P of a power transformer 110 being driven high or by compensating for a primary winding P of a power transformer 110 being driven low.

Figure 15A:
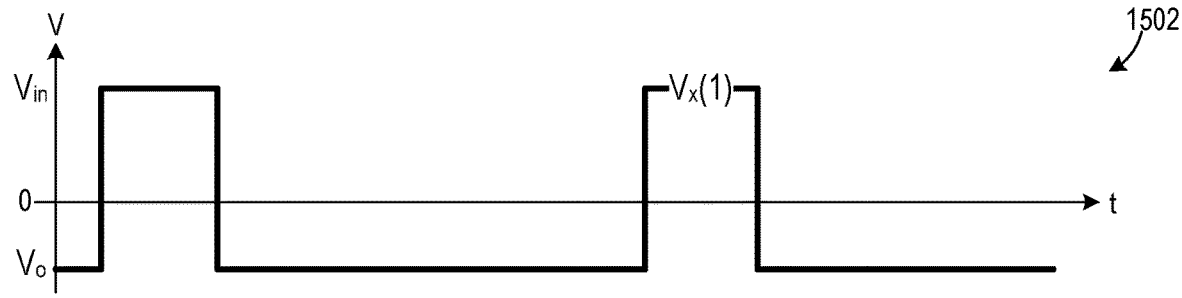
FIGS. 15A-15D are graphs illustrating one example of operation of an embodiment of the FIG. 14 switching power converter.
Figure 15B:
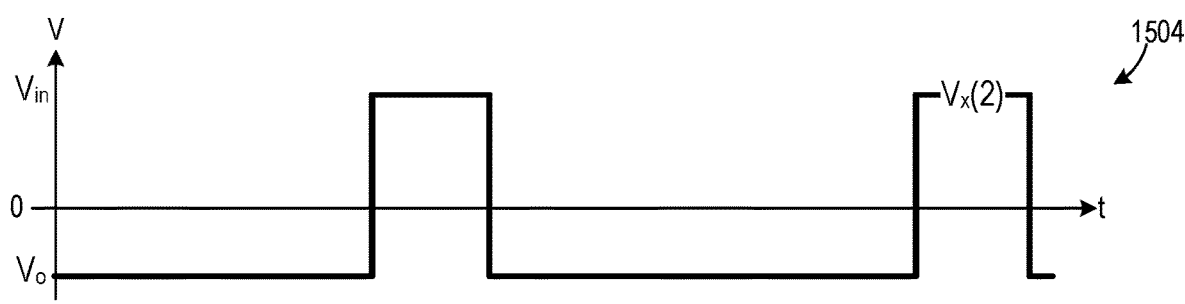
Figure 15C:
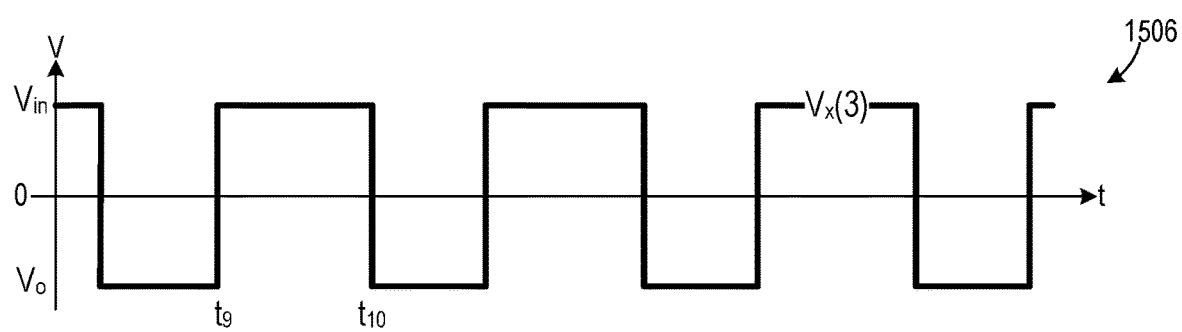
Figure 15D:
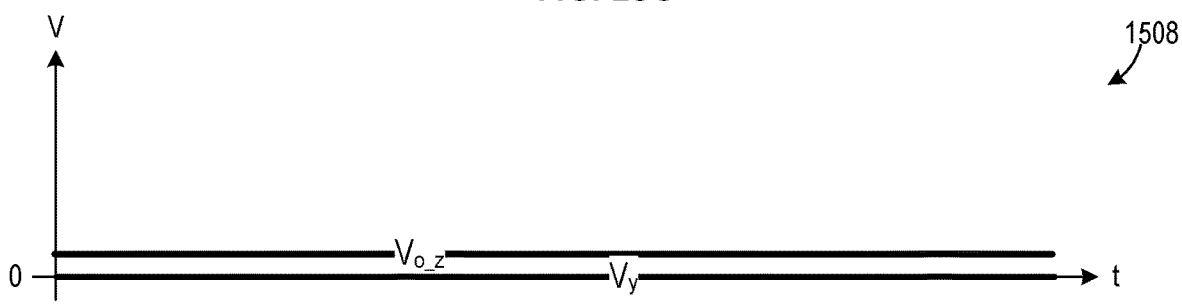

For example, FIGS. 15A-15D are graphs collectively illustrating one example of operation of an embodiment of switching power converter 1400. Graphs 15A-15D assume that the magnetizing inductance value of each transformer 110 and 120 is much greater than any leakage inductance value of the transformers. Graph 1502 is a graph of switching node voltage $V_x(1)$ versus time, and graph 1504 is a graph of switching node voltage $V_x(2)$ versus time. FIG. 15C is a graph 1506 including a curve representing voltage at the injection switching node X(3). FIG. 15D is a graph 1508 of (a) output injection node voltage $V_{o\_z}$ and (b) intermediate voltages $V_y$ between primary windings P of ideal transformers 310 and leakage inductances $L_k$. Each intermediate voltage $V_y$ has essentially the same value due to the magnetizing inductance value of the power transformers being very large relative to the leakage inductance values of the power transformers and the inductance of tuning inductor 1430.

In the example of FIGS. 15A-15D, controller 1406 controls injection stage 1404 so that injection stage 1404 switches in a manner which compensates for primary windings P of power transformers being driven low. Specifically, primary winding P of injection transformer 120 is driven high in response to a primary winding P of any power transformer 110 being driven low, and the primary winding P of injection transformer 120 is driven low in response to the primary winding P of any power transformer 110 being driven high, as illustrated in FIGS. 15A-15C. For example, primary winding P of injection transformer 120 is driven high at time $t_9$ in response to primary winding P of power transformer 110(1) being driven low, and primary winding P of injection transformer 120 is driven low at time $t_{10}$ in response to primary winding P of power transformer 110(2) being driven high. Consequently, intermediate voltages $V_y$ remain essentially constant at zero volts, as shown in FIG. 15D. Therefore, voltages $V_L$ across leakage inductances $L_k$ remain essentially at zero even as primary windings P of power transformers 110 are repeatedly driven between high and low states to regulate one or more parameters of switching power converter 1400. As a result, there is no material ripple current associated with leakage inductance $L_k$, irrespective of operating duty cycle of switching power converter 1400.

Similar to the example of FIGS. 4A-4D, the example of FIGS. 15A-15D assumes essentially ideal magnetic coupling of the windings of transformers 110 and 120. However, injection stage 1404 may significantly reduce ripple current magnitude even if non-ideal coupling of transformers 110 and 120 prevents injection stage 1404 from completely eliminating ripple current associated with leakage inductances $L_k$. Additionally, while FIGS. 15A-15D assume ideal timing, i.e., that injection stage 1404 switches in synchronicity with power stages 1402, timing may vary while still achieving acceptable operation of switching power converter 1400.

While the injection stages of the new switching power converters achieve significant benefits, they may degrade switching power converter transient response. Accordingly, some embodiments of controllers 106, 1206, and 1406 are configured to disable the injection stage of their respective switching power converter in response to a signal indicating that the switching power converter is experiencing a transient event, such as a significant change in load or a significant change in input voltage. In some embodiments, controllers 106, 1206, and 1406 internally generate the signal indicating that the power converter is experiencing a transient event, and in some other embodiments, controllers 106, 1206, and 1406 receive such signal from an external source. Alternately, some embodiments of controllers 106, 1206, and 1406 are configured to change timing of the injection stage of their respective switching power converter in response to a signal indicating that the switching power converter is experiencing a transient event, such as to help the converter quickly respond to the transient event.

Figure 16:
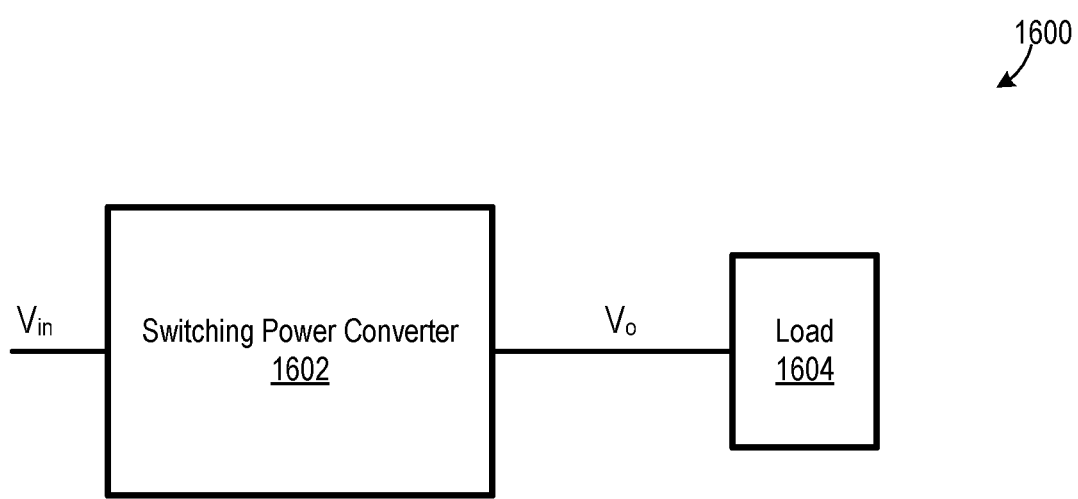
FIG. 16 is a block diagram of an example application of the switching power converters disclosed herein.

FIG. 16 is a block diagram of an electrical system 1600, which is one possible application of the new switching power converters disclosed herein. System 1600 includes a switching power converter 1602 configured to power a load 1604. Switching power converter 1602 may be any one of the new switching power converters disclosed herein. For example, switching power converter 1600 may be any one of switching power converters 100, 600, 800, 1000, 1200, and 1400. Load 1604 includes, for example, one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

Experimental Results

Figure 17:
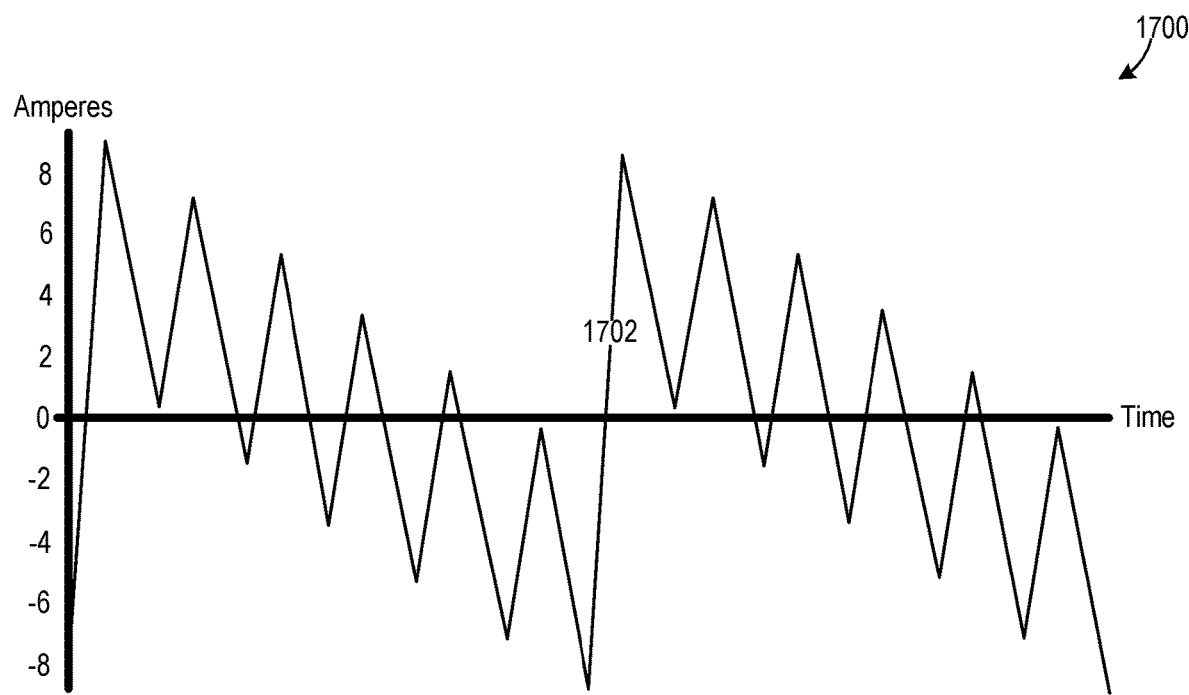
FIG. 17 is a graph illustrating a simulated example of operation of a switching power converter like that of FIG. 1 but with an injection stage omitted.
Figure 18:
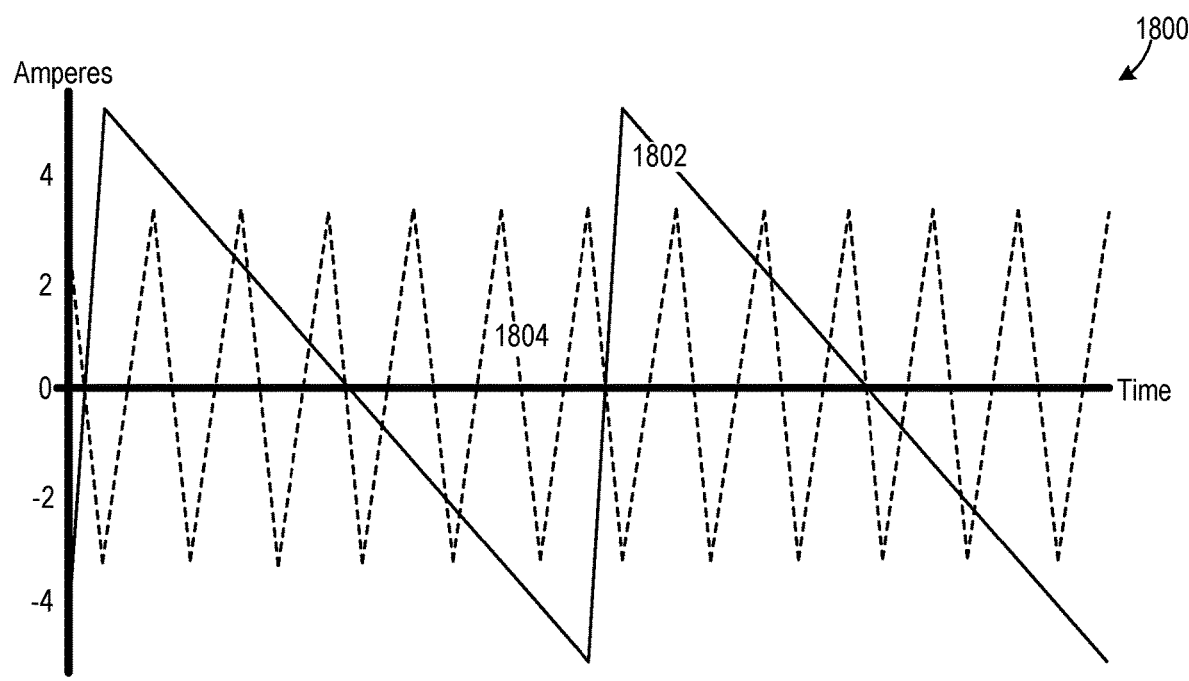
FIG. 18 is a graph illustrating an example of operation of the same switching power converter considered in FIG. 17 but with an injection stage included.

Discussed below with respect to FIGS. 17 and 18 are computer simulations of an embodiment of the new switching power converters with transformers and injection stages. It is realized, though, that the new switching power converters are not limited to performing according to these simulations.

FIG. 17 is a graph 1700 of power stage 102(1) current $I_{L1}$ (see FIG. 1) versus time of a switching power converter like that of FIG. 1, but with injection stage 104 omitted. In this example, (a) N is equal to six, (b) magnetizing inductance of each transformer 110 and 120 is 150 nanohenries (nH), (c) each leakage inductance of transformers 110 and 120 is 5 nH, (d) inductance of tuning inductor 130 is 120 nH, (e) switching frequency is 400 kilohertz (KHz) per power stage 102, (f) $V_{in}$ is 12 volts, and (g) $V_o$ is 0.8 volts. As shown in FIG. 17, total peak-to-peak ripple current associated with leakage and magnetizing inductances is relatively large, i.e., over 18 amperes. Additionally, there is a ripple current component corresponding to the product of N and switching frequency, i.e., 6*400=2,400 KHz. FIG. 18 is a graph 1800 of current versus time of the same power converter that was simulated in graph 1700 but with injection stage 104 included in the switching power converter. FIG. 18 includes a curve 1802 representing current $I_{L1}$ as well as a curve 1804 representing current $I_{ij}$ (see FIG. 1) through primary winding P of injection stage 104. Current $I_{ij}$ has a frequency which is equal to the switching frequency of the switching power converter multiplied by the number of phases. However, injection stage 104 eliminates ripple current resulting from leakage inductances in all phases 1-6, such that the only ripple current component in current $I_{L1}$ is ripple current associated with magnetizing inductance of power transformers 110 and 120. The ripple current associated with magnetizing inductance has a much smaller peak-to-peak value of approximately 10 amperes, as well as a much lower frequency. Thus, the simulations of FIGS. 17 and 18 show that injection stage 104 is capable of significantly reducing ripple current magnitude and related losses.

Embodiments Without Injection Stages

Figure 19:
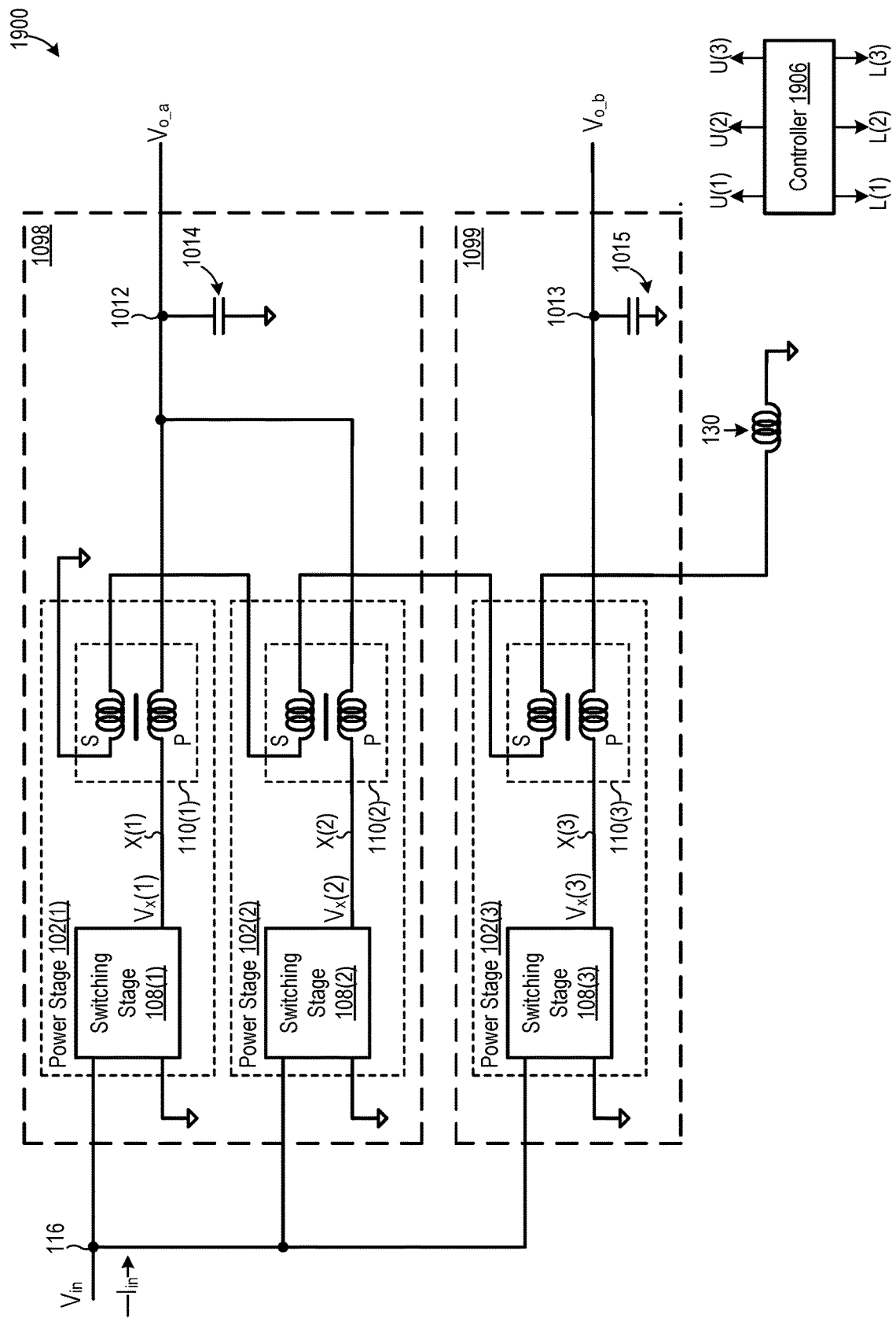
FIG. 19 is a schematic diagram of an alternate embodiment of the FIG. 10 switching power converter with an injection stage omitted.

Referring again to FIG. 10, the concept of dividing power stages among power-sub converters that are electrically linked can also be applied to switching power converters without injection stages, albeit without the ripple reduction achieved by injection stages. For example, FIG. 19 is a schematic diagram of a switching power converter 1900, which is an alternate embodiment of switching power converter 1000 of FIG. 10 where (a) injection stage 104 is omitted and (b) controller 106 replaced with a controller 1906. Controller 1906 is the same as controller 106 except that controller 1906 does not generate control signals UI and LI. Similar to switching power converter 1000, switching power converter 1900 could be modified to include a different number of power stages 102, a different number of power sub-converters, and/or a different distribution of power stages 102 among power sub-converters. Additionally, two or more power sub-converters could be daisy chained, i.e., an output of one power sub-converter could be an input of another power sub-converter. The power sub-converters could also have a different topology, and each power sub-converter need not have the same topology.

Figure 20:
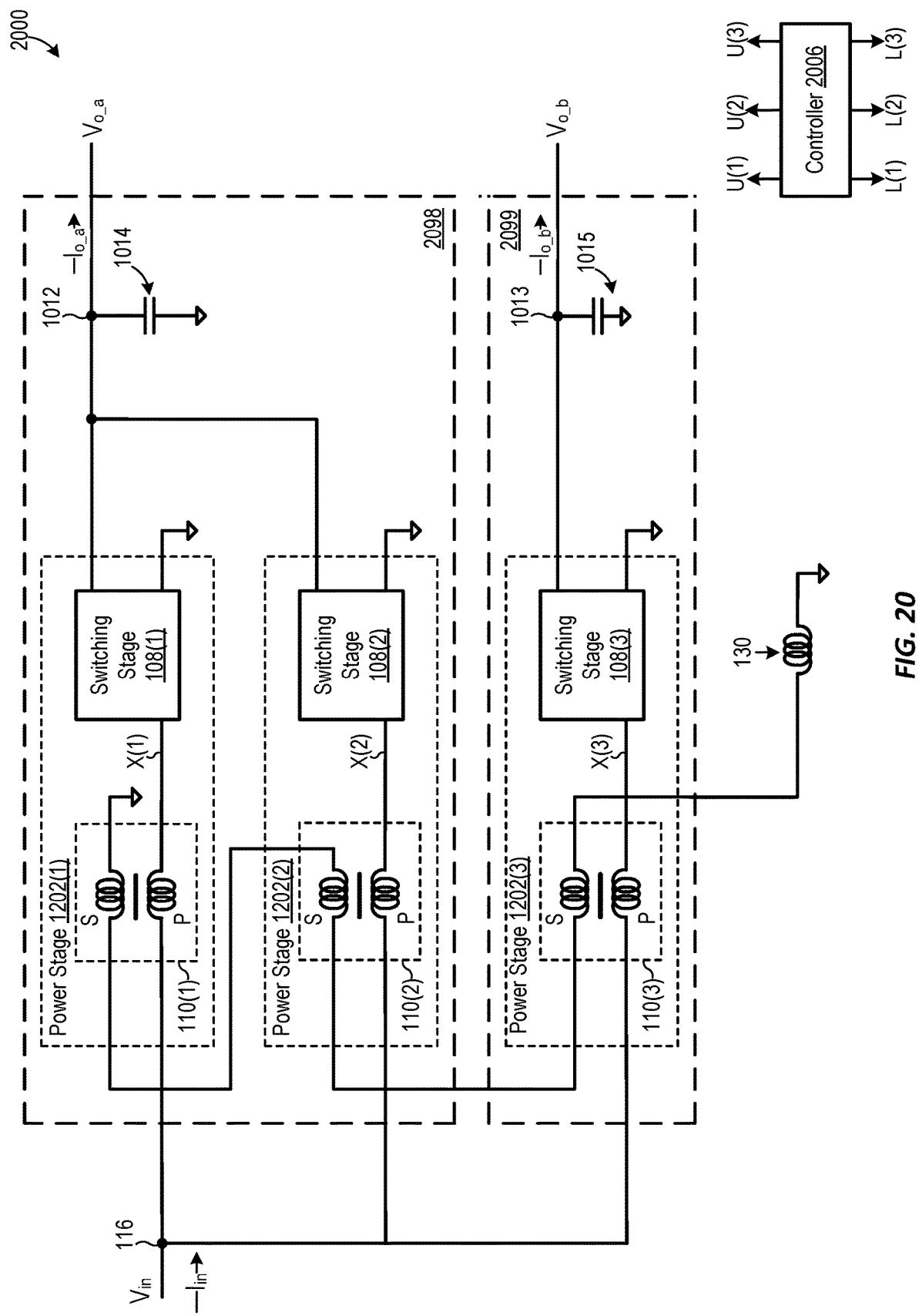
FIG. 20 is a schematic diagram of an alternate embodiment of the FIG. 19 switching power converter having a boost-type topology.

For example, FIG. 20 is a schematic diagram of a switching power converter 2000, which is an alternate embodiment of switching power converter 1900 of FIG. 19 where (a) power sub-converters 1098 and 1099 are replaced with power sub-converters 2098 and 2099, respectively, and (b) controller 1906 is replaced with a controller 2006. Power sub-converters 2098 and 2099 are like power sub-converters 1098 and 1099, respectively, except that power stages 102 are replaced with boost-type power stages 1202 of FIG. 12, such that switching power converter 2000 has a multi-phase boost-type topology. Controller 2006 is like controller 1906, except that controller 2006 is configured to generate control signals U and L to control power switching stages 108 according to a boost-type control scheme to regulate one or more parameters of power sub-converters 2098 and 2099, such as using a PWM and/or PFM technique. Examples of possible regulated parameters include, but are not limited, magnitude of input voltage $V_{in}$, magnitude of input current $I_{in}$, magnitude of output voltage $V_{o\_a}$, magnitude of output current $I_{o\_a}$, magnitude of output voltage $V_{o\_b}$, and magnitude of output current $I_{o\_b}$.

Figure 21:
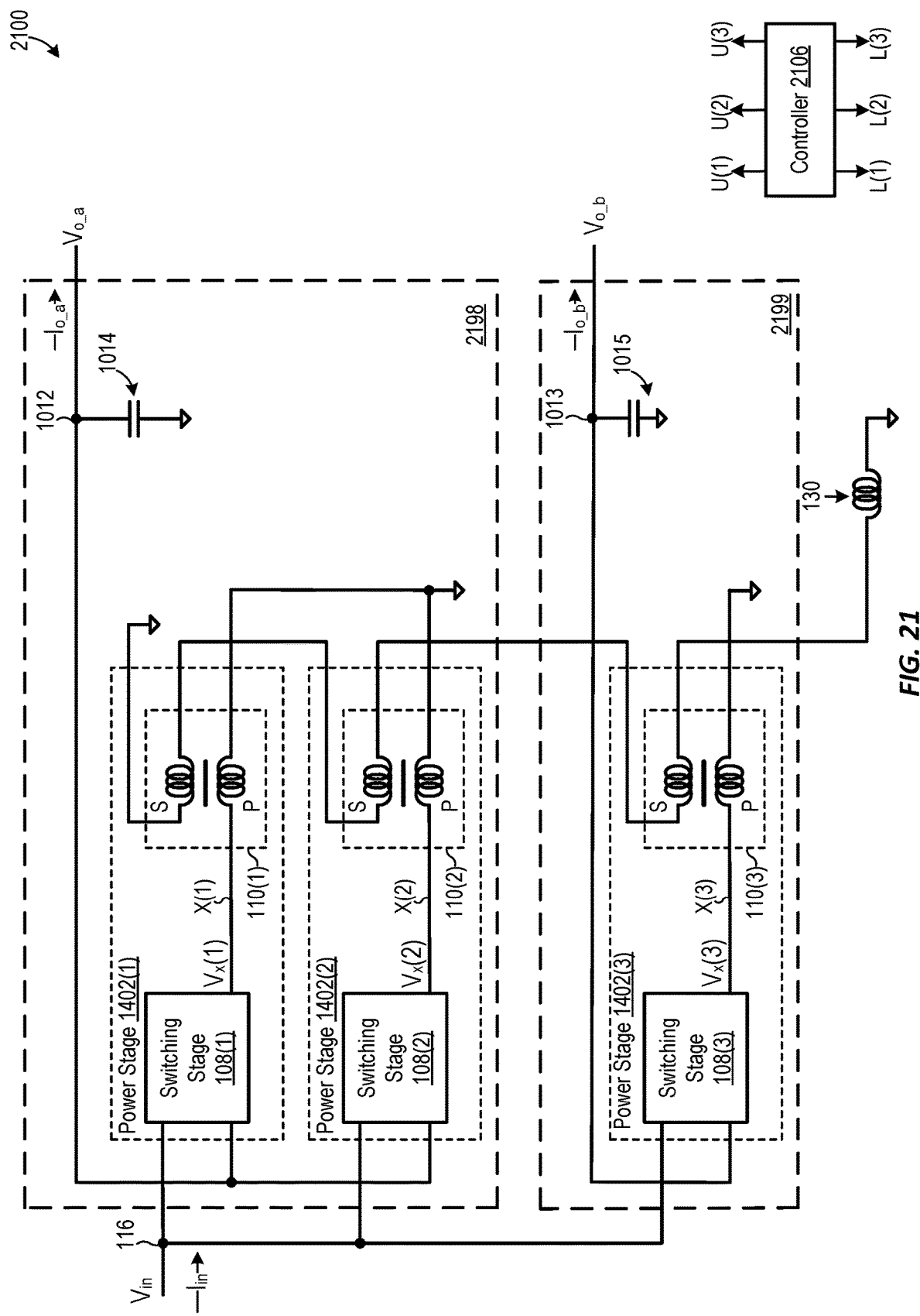
FIG. 21 is a schematic diagram of an alternate embodiment of the FIG. 19 switching power converter having a buck-boost-type topology.

As another example of an alternate topology of switching power converter 1900, FIG. 21 is a schematic diagram of a switching power converter 2100, which is an alternate embodiment of switching power converter 1900 of FIG. 19 where (a) power sub-converters 1098 and 1099 are replaced with power sub-converters 2198 and 2199, respectively, and (b) controller 1906 is replaced with a controller 2106. Power sub-converters 2198 and 2199 are like power sub-converters 1098 and 1099, respectively, except that power stages 102 are replaced with buck-boost-type power stages 1402 of FIG. 14, such that switching power converter 2100 has a multi-phase buck-boost-type topology. Controller 2106 is like controller 1906, except that controller 2106 is configured to generate control signals U and L to control power switching stages 108 according to a buck-boost-type control scheme to regulate one or more parameters of power sub-converters 2198 and 2199, such as using a PWM and/or PFM technique. Examples of possible regulated parameters include, but are not limited, magnitude of input voltage Vim magnitude of input current $I_{in}$, magnitude of output voltage $V_{o\_a}$, magnitude of output current $I_{o\_a}$, magnitude of output voltage $V_{o\_b}$, and magnitude of output current $I_{o\_b}$.

Figure 22:
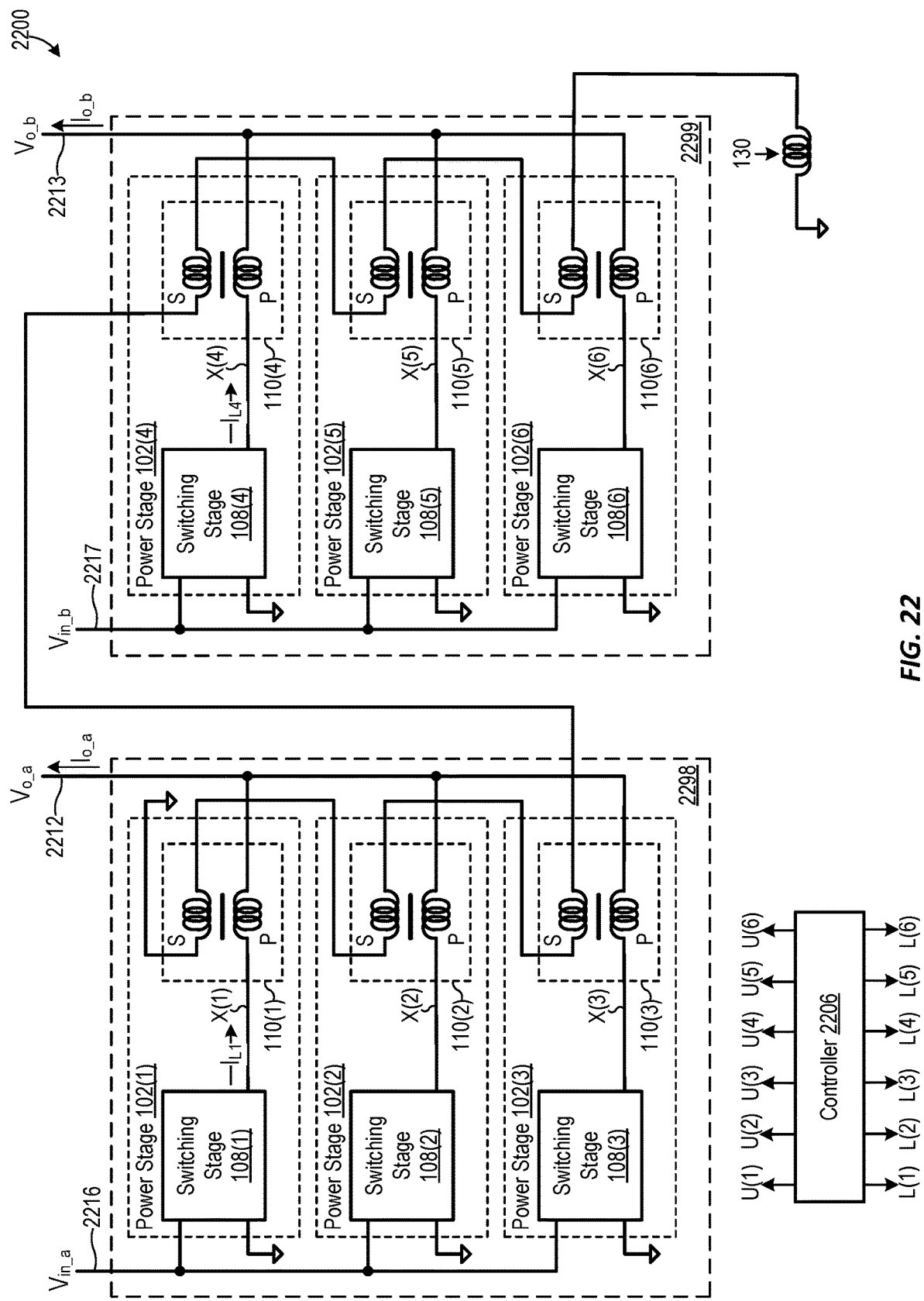
FIG. 22 is a schematic diagram of an alternate embodiment of the FIG. 19 switching power converter including two power sub-converters powered from different input power nodes.

Referring again to FIG. 19, two or more power sub-converters of switching power converter 1900 could be powered from different input power nodes. For example, FIG. 22 is a schematic diagram of a switching power converter 2200, which is an alternate embodiment of switching power converter 1900 where two power sub-converters are powered from different input power nodes. In this embodiment, N is equal to six. Power stages 102(1), 102(2), and 102(3) are part of a power sub-converter 2298, and each of these power stages is electrically coupled between an input power node 2216 and an output power node 2212 of power sub-converter 2298. Power stages 102(4), 102(5), and 102(6) are part of a power sub-converter 2299, and each of these power stages is electrically coupled between an input power node 2217 and an output power node 2213 of power sub-converter 2299. Input power nodes 2216 and 2217 are at respective voltages $V_{in\_a}$ and $V_{in\_b}$, and these two voltages need not be the same. Output power nodes 2212 and 2213 are at respective voltages $V_{o\_a}$ and $V_{o\_b}$ respectively, and these two voltages also need not be the same. While not required, it is anticipated that a respective capacitor will be electrically coupled to each of input power node 2216, input power node 2217, output power node 2212, and output power node 2213, although these capacitors are not shown in FIG. 22 for illustrative clarity.

In power sub-converter 2298, the primary winding P of each power transformer 110 is electrically coupled between output power node 2212 and a switching node X of the respective power stage 102. The upper and lower switching devices of each power switching stage 108, e.g., switching devices 206 and 208 of FIG. 2, are electrically coupled in series between input power node 2216 and ground. Accordingly, each power switching stage 108 is configured to repeatedly switch its respective switching node X between voltage $V_{in\_a}$ of input power node 2216 and ground. A primary winding P of a given power transformer 110 in power sub-converter 2298 is driven high when its respective switching node X is at voltage $V_{in\_a}$, and the primary winding P of the power transformer 110 is driven low when its respective switching node X is at zero volts relative to ground.

In power sub-converter 2299, the primary winding P of each power transformer 110 is electrically coupled between output power node 2213 and a switching node X of the respective power stage 102. The upper and lower switching devices of each power switching stage 108, e.g., switching devices 206 and 208 of FIG. 2, are electrically coupled in series between input power node 2217 and ground. Accordingly, each power switching stage 108 is configured to repeatedly switch its respective switching node X between voltage $V_{in\_b}$ of input power node 2217 and ground, in power sub-converter 2299. A primary winding P of a given power transformer 110 in power sub-converter 2299 is driven high when its respective switching node X is at voltage $V_{in\_b}$, and the primary winding P of the power transformer 110 is driven low when its respective switching node X is at zero volts relative to ground.

Secondary windings S of each power transformer 110 in switching power converter 2200 are electrically coupled in series. Additionally, an instance of tuning inductor 130 is electrically coupled in series with secondary windings S of all power transformers 110 in switching power converter 2200. The topological location of tuning inductor 130 in switching power converter 2200 may vary as long as tuning inductor 130 is electrically coupled in series with secondary windings S of all power transformers 110. While FIG. 22 depicts the series connections of secondary windings S being partially embodied by a ground node, secondary windings S could alternately be isolated from ground, as long as they are electrically coupled in series.

Controller 2206, which is an embodiment of controller 1906, is configured to generate control signals U and L to control duty cycle of power stages 102 of power sub-converter 2298 to regulate at least one parameter of power sub-converter 2298, such as using a PWM technique and/or a PFM technique. Examples of possible regulated parameters of power sub-converter 2298 include, but are not limited, magnitude of input voltage $V_{in\_a}$, magnitude of input current to power sub-converter 2298 (not shown), magnitude of output voltage $V_{o\_a}$, and magnitude of output current $I_{o\_a}$. Additionally, controller 2206 is configured to generate control signals U and L to control duty cycle of power stages 102 of power sub-converter 2299 to regulate at least one parameter of power sub-converter 2299, such as using a PWM technique and/or a PFM technique. Examples of possible regulated parameters of power sub-converter 2299 include, but are not limited, magnitude of input voltage $V_{in\_b}$, magnitude of input current to power sub-converter 2299 (not shown), magnitude of output voltage $V_{o\_b}$, and magnitude of output current $I_{o\_b}$. In particular embodiments, controller 2206 is configured to generate control signals U and L such that power sub-converters 2298 and 2299 operate at least partially independently of each other. Controller 2206 is optionally configured to generate control signals U and L such that power stages 102 switch out-of-phase with each other.

Switching power converter 2200 could be modified to include additional power sub-converters. Additionally, quantity of power stages per power sub-converter could vary without departing from the scope hereof. Furthermore, each power sub-converter need not have the same number of power stages, and configurations of power stages could vary among power sub-converters. For example, switching power converter 2200 could be modified so that power stages 102 of power sub-converter 2298 have a multi-phase boost-type topology while power stages 102 of power sub-converter 2299 have a multi-phase buck or buck-boost topology. A multi-phase boost-type topology is achieved in a given power sub-converter 2298 or 2299, for example by replacing power stages 102 of the power sub-converter with power stages 1202 of FIG. 12. A multi-phase buck-boost-type topology is achieved in a given power sub-converter 2298 or 2299, for example by replacing power stages 102 of the power sub-converter with power stages 1402 of FIG. 14.

It should be appreciated power sub-converters 2298 and 2299 share a common instance of tuning inductor 130 even though the two power sub-converters have different respective input power nodes and different respective output power nodes, which promotes small size and low cost of switching power converter 2200. Additionally, the fact that power sub-converters 2298 and 2299 are electrically linked via power transformer 110 secondary windings S, instead being of separate stand-alone power converters, may advantageously reduce ripple current magnitude in the power sub-converters.

Figure 23A:
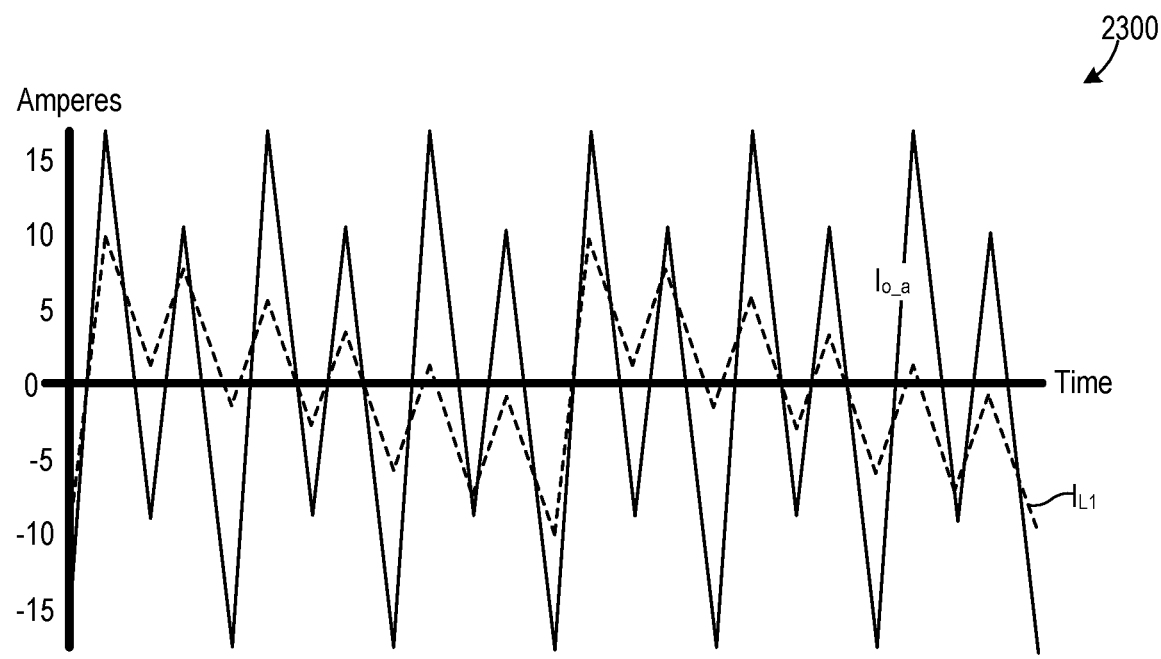
FIGS. 23A and 23B are graphs illustrating a simulated example of operation of the FIG. 22 switching power converter.
Figure 23B:
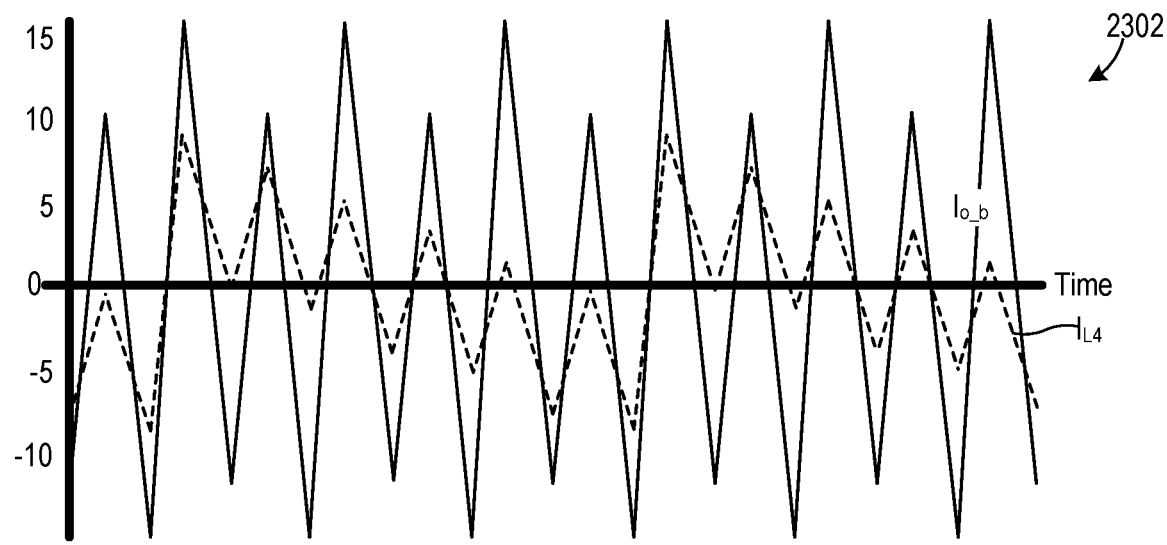

For example, FIGS. 23A, 23B, 24A and 24B collectively illustrate one example of how electrically linking power sub-converters 2298 and 2299 may reduce ripple current magnitude. FIGS. 23A and 23B are graphs 2300 and 2302, respectively, of simulated current versus time of an embodiment of switching power converter 2200 where (a) $V_{in\_a}$=12 volts, (b) $V_{in\_b}$=12 volts, (c) $V_{out\_a}$=0.9 volts, (d) $V_{out\_b}$=0.8 volts, (e) switching frequency is 400 KHz per phase, (f) each power transformer 110 has a magnetizing inductance values of 150 nH and leakage inductance values of 5 nH, and (g) tuning inductor 130 has an inductance of 120 nH. Graphs 2300 and 2302 have a common time base. Graph 2300 includes curves representing currents $I_{o\_a}$ and $I_{L1}$, where current $I_{o\_a}$ is output current of power sub-converter 2298 and current $I_{L1}$ is current through primary winding P of power transformer 110(1) of power sub-converter 2298 (see FIG. 22). Graph 2302 includes curves representing currents $I_{o\_b}$ and $I_{L4}$, where current $I_{o\_b}$ is output current of power sub-converter 2299 and current $I_{L4}$ is current through primary winding P of power transformer 110(4) of power sub-converter 2299 (see FIG. 22). Currents $I_{o\_a}$, $I_{L1}$, $I_{o\_b}$, and $I_{L4}$ have peak-to-peak magnitudes of 34.2 amperes, 9.8 amperes, 30.1 amperes, and 8.8 amperes, respectively, in the example of graphs 2100 and 2102.

Figure 24A:
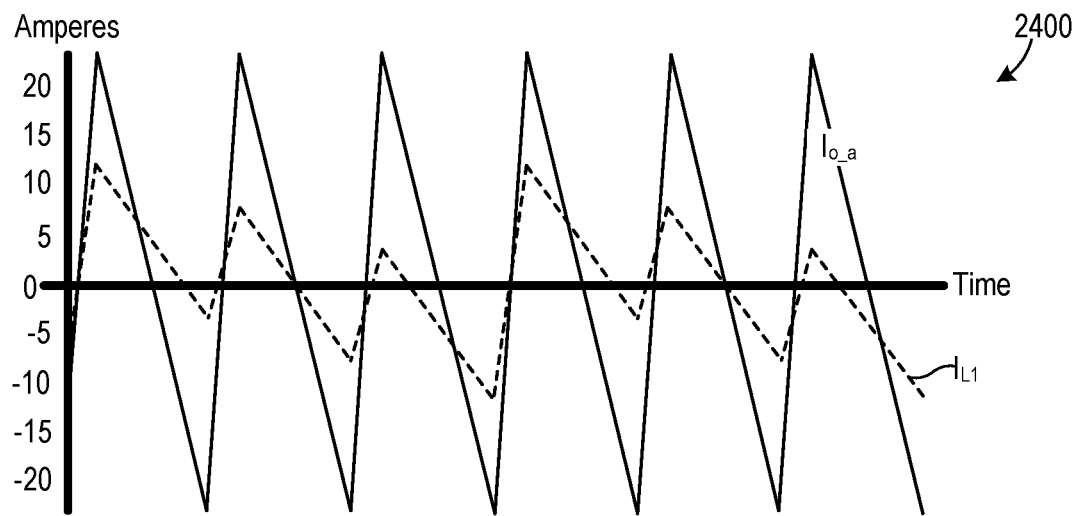
FIGS. 24A and 24B are graphs illustrating a simulated example of operation of a switching power converter of FIG. 25.
Figure 24B:
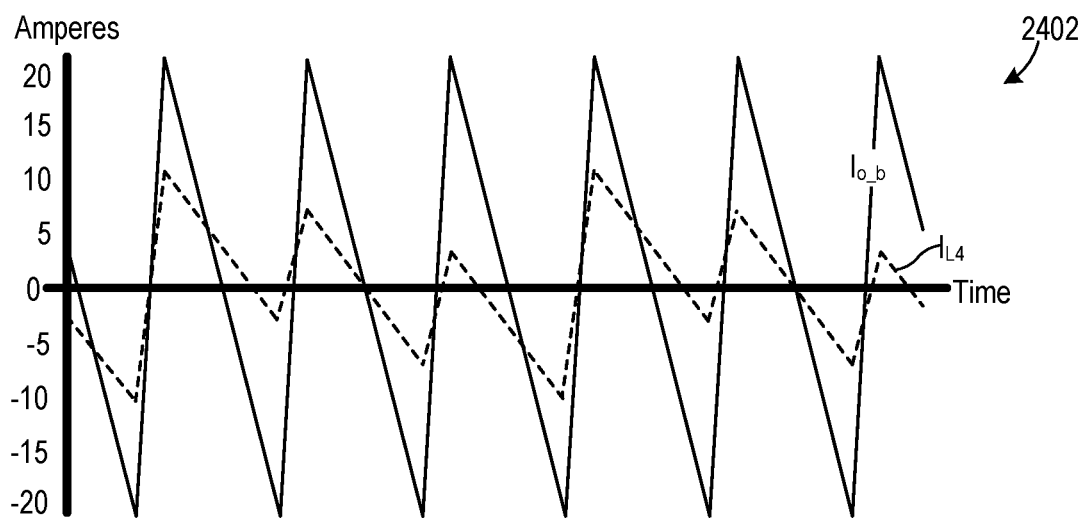
Figure 25:
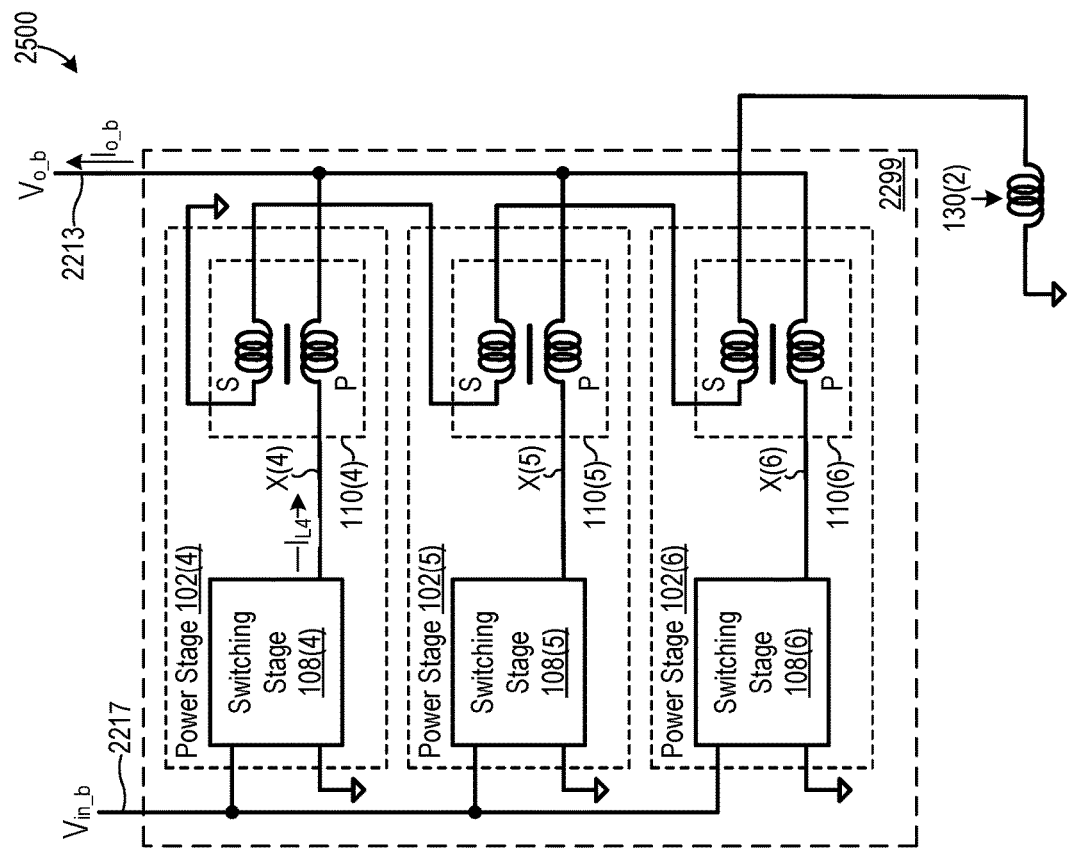
FIG. 25 is a schematic diagram of a switching power converter like the FIG. 22 switching power converter but where power sub-converters are not electrically linked.
Figure 25:
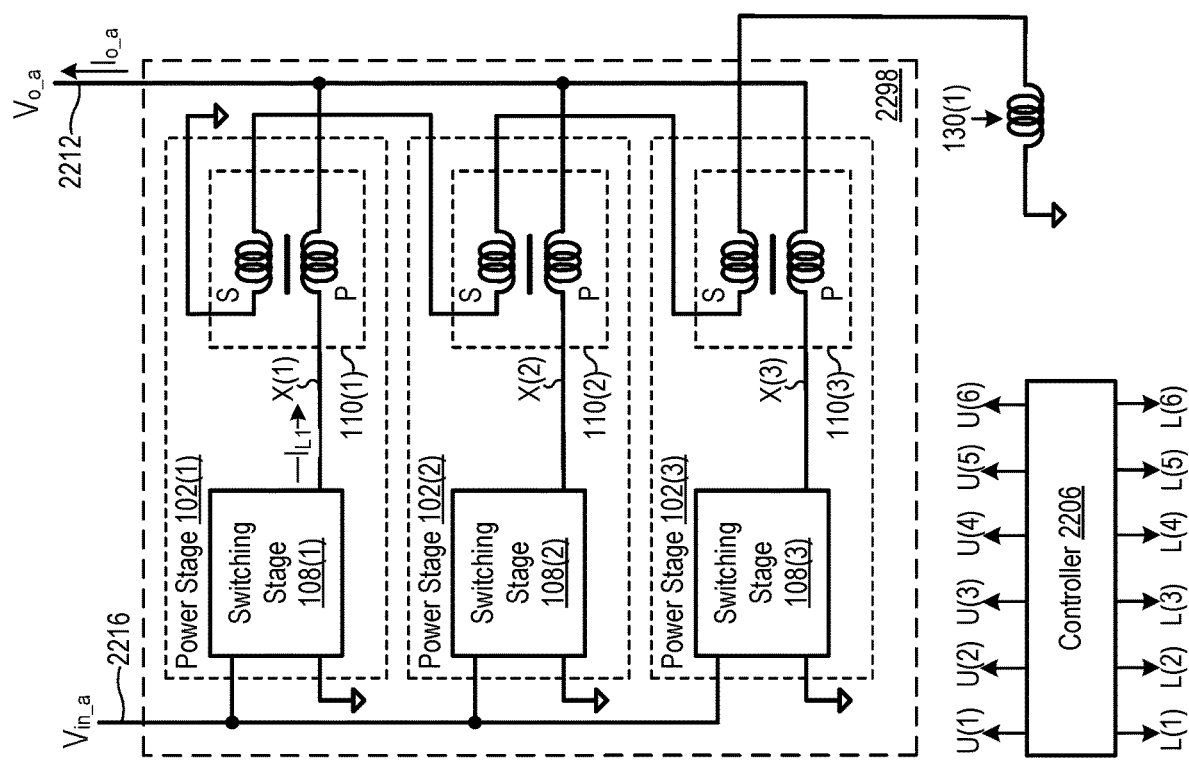

FIGS. 24A and 24B are graphs 2400 and 2402, respectively, of simulated current versus time of a switching power converter 2500 of FIG. 25. Switching power converter 2500 is like switching power converter 2200 of FIG. 22 except (a) power sub-converters 2298 and 2299 are not electrically linked in switching power converter 2500 and (b) a respective instance of tuning inductor 130 is electrically coupled in series with secondary windings S of each power sub-converter 2298 and 2299 in switching power converter 2500. In the example of FIGS. 24A and 24B (a) $V_{in\_a}$=12 volts, (b) $V_{in\_b}$=12 volts, (c) $V_{out\_a}$=0.9 volt, (d) $V_{out\_b}$=0.8 volt, (e) switching frequency is 400 KHz per phase, (f) each power transformer 110 has a magnetizing inductance values of 150 nH and leakage inductance values of 5 nH, and (g) each tuning inductor 130 instance has an inductance of 120 nH. As such, the operating conditions of switching power converter 2500 in the example of FIGS. 24A and 24B are the same as the operating conditions of switching power converter 2200 in the examples of FIGS. 23A and 23B.

Graphs 2400 and 2402 have a common time base. Graph 2400 includes curves representing currents $I_{o\_a}$ and $I_{L1}$, where current $I_{o\_a}$ is output current of power sub-converter 2298 and current $I_{L1}$ is current through primary winding P of power transformer 110(1), in switching power converter 2500. Graph 2402 includes curves representing currents $I_{o\_b}$ and $I_{L4}$, where current $I_{o\_b}$ is output current of power sub-converter 2299 and current $I_{L4}$ is current through primary winding P of power transformer 110(4) of power sub-converter 2299, in switching power converter 2500. Currents $I_{o\_a}$, $I_{L1}$, $I_{o\_b}$, and $L_{L4}$ have peak-to-peak magnitudes of 46.3 amperes, 11.3 amperes, 42.6 amperes, and 10.7 amperes, respectively, in the example of graphs 2400 and 2402. As such, ripple current magnitudes are significantly smaller for switching power converter 2200 than for switching power converter 2500 in the examples of FIGS. 23A, 23B, 24A, and 24B, which shows that electrically linking power sub-converters 2298 and 2299 via power transformer 110 secondary windings S may significantly reduce ripple current magnitude.

Combinations of Features

Features described above may be combined in various ways without departing from the scope hereof. The following examples illustrate some possible combinations.

(A1) A method for operating a switching power converter to reduce ripple current magnitude includes (1) controlling duty cycle of a plurality power stages of the switching power converter to regulate at least one parameter of the switching power converter, each power stage including a respective power transformer, and (2) controlling an injection stage of the switching power converter to reduce voltage across leakage inductance of each power transformer, the injection stage including an injection transformer that is electrically coupled to a respective secondary winding of each power transformer.

(A2) In the method denoted as (A1), a secondary winding of the injection transformer may be electrically coupled in series with the respective secondary winding of each power transformer.

(A3) In any one of the methods denoted as (A1) and (A2), a tuning inductor may be electrically coupled in series with the respective secondary winding of each power transformer.

(A4) Any one of the methods denoted as (A1) through (A3) may further include causing the plurality of power stages to switch out-of-phase with respect to each other.

(A5) In any one of the methods denoted as (A1) through (A4), controlling the injection stage to reduce voltage across leakage inductance of each power transformer may include driving the primary winding of the injection transformer high in response to a primary winding of a power transformer being driven low.

(A6) In any one of the methods denoted as (A1) through (A4), controlling the injection stage to reduce voltage across leakage inductance of each power transformer may include causing the injection stage to compensate for the primary winding of one or more of the power transformers being driven low.

(A7) In any one of the methods denoted as (A1) through (A4), controlling the injection stage to reduce voltage across leakage inductance of each power transformer may include driving the primary winding of the injection transformer high in response to a primary winding of a power transformer being driven high.

(A8) In any one of the methods denoted as (A1) through (A4), controlling the injection stage to reduce voltage across leakage inductance of each power transformer may include causing the injection stage to compensate for the primary winding of one or more of the power transformers being driven high.

(A9) Any one of the methods denoted as (A1) through (A8) may further include disabling the injection stage in response to a signal indicating that the switching power converter is experiencing a transient event.

(A10) In any one of the methods denoted as (A1) through (A9), the at least one parameter of the switching power converter may include one of magnitude of a voltage and magnitude of a current.

(A11) In any one of the methods denoted as (A1) through (A10), the switching power converter may have a topology selected from the group consisting of a multi-phase buck-type topology, a multi-phase boost-type topology, and a multi-phase buck-boost-type topology.

(A12) In any one of the methods denoted as (A1) through (A11), two or more of the plurality of power stages may be part of different respective power sub-converters.

(B1) A switching power converter includes (1) a plurality of power stages, each power stage including a respective power transformer, (2) an injection stage including an injection transformer that is electrically coupled to a respective secondary winding of each power transformer, and (3) a controller configured to (a) control duty cycle of the plurality power stages to regulate at least one parameter of the switching power converter and (b) control the injection stage to reduce voltage across leakage inductance of each power transformer.

(B2) In the switching power converter denoted as (B1), a secondary winding of the injection transformer may be electrically coupled in series with the respective secondary winding of each power transformer.

(B3) Any one of the switching power converters denoted as (B1) or (B2) may further include a tuning inductor electrically coupled in series with the respective secondary winding of each power transformer.

(B4) In any one of the switching power converters denoted as (B1) through (B3), (1) each power stage may include a respective power switching stage electrically coupled to a primary winding of the respective power transformer of the power stage, and (2) the injection stage may include an injection switching stage electrically coupled to a primary winding of the injection transformer.

(B5) The switching power converter denoted as (B4) may further include a capacitor electrically coupled to the primary winding of the injection transformer.

(B6) In any one of the switching power converters denoted as (B1) through (B5), the controller may be further configured to cause the plurality of power stages to switch out-of-phase with respect to each other.

(B7) In any one of the switching power converters denoted as (B1) through (B6), the controller may be further configured to control the injection stage to reduce voltage across leakage inductance of each power transformer at least partially by causing the injection stage to compensate for the secondary winding of one or more of the power transformers being driven low.

(B8) In any one of the switching power converters denoted as (B1) through (B6), the controller may be further configured to control the injection stage to reduce voltage across leakage inductance of each power transformer at least partially by causing the injection stage to compensate for the secondary winding of one or more of the power transformers being driven high.

(B9) In any one of the switching power converters denoted as (B1) through (B8), the switching power converter may have a topology selected from the group consisting of a multi-phase buck-type topology, a multi-phase boost-type topology, and a multi-phase buck-boost-type topology.

(B10) In any one of the switching power converters denoted as (B1) through (B 9), two or more of the plurality of power stages may be part of different respective power sub-converters.

(C1) A switching power converter includes (1) a first power sub-converter including one or more first power stages, each first power stage including a respective first power transformer, wherein a primary winding of each first power transformer is electrically coupled to a first power node, (2) a second power sub-converter including one or more second power stages, each second power stage including a respective second power transformer, wherein a primary winding of each second power transformer is electrically coupled to a second power node that is different from the first power node, and (3) a tuning inductor electrically coupled in series with a secondary winding of each first power transformer and with a secondary winding of each second power transformer.

(C2) In the switching power converter denoted as (C1), each first power stage may further include a respective power switching stage electrically coupled to the primary winding of the first power transformer of the first power stage, and each second power stage may further include a respective power switching stage electrically coupled to the primary winding of the second power transformer of the second power stage.

(C3) The switching power converter denoted as (C2) may further include a controller configured to control switching of the respective power switching stage of each first power stage and each second power stage to (1) regulate one or more parameters of the first power sub-converter and (2) regulate one or more parameters of the second power sub-converter.

(C4) In any one of the switching power converters denoted as (C1) through (C3), the switching power converter may be configured such that first and second power nodes are at different respective voltages during operation of the switching power converter.

(C5) In any one of the switching power converters denoted as (C1) through (C4), the first power node may be one of a first input power node and a first output power node, and the second power node may be one of a second input power node and a second output power node.

(C6) In any one of the switching power converters denoted as (C1) through (C5), each of the first power sub-converter and the second power sub-converter may be powered from different respective input power nodes.

(C7) In any one of the switching power converters denoted as (C1) through (C6), the switching power converter may have a topology selected from the group consisting of a multi-phase buck-type topology, a multi-phase boost-type topology, and a multi-phase buck-boost-type topology.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for operating a switching power converter to reduce ripple current magnitude, comprising:

controlling duty cycle of a plurality power of stages of the switching power converter to regulate at least one parameter of the switching power converter, each power stage including a respective power transformer; and controlling an injection stage of the switching power converter to reduce voltage across leakage inductance of each power transformer, the injection stage including an injection transformer that is electrically coupled to a respective secondary winding of each power transformer.

2. The method of claim 1, wherein a secondary winding of the injection transformer is electrically coupled in series with the respective secondary winding of each power transformer.

3. The method of claim 1, wherein a tuning inductor is electrically coupled in series with the respective secondary winding of each power transformer.

4. The method of claim 1, further comprising causing the plurality of power stages to switch out-of-phase with respect to each other.

5. The method of claim 1, wherein controlling the injection stage to reduce voltage across leakage inductance of each power transformer comprises driving a primary winding of the injection transformer high in response to a primary winding of a power transformer being driven low.

6. The method of claim 1, wherein controlling the injection stage to reduce voltage across leakage inductance of each power transformer comprises causing the injection stage to compensate for a primary winding of one or more of the power transformers being driven low.

7. The method of claim 1, wherein controlling the injection stage to reduce voltage across leakage inductance of each power transformer comprises driving a primary winding of the injection transformer high in response to a primary winding of a power transformer being driven high.

8. The method of claim 1, wherein controlling the injection stage to reduce voltage across leakage inductance of each power transformer comprises causing the injection stage to compensate for a primary winding of one or more of the power transformers being driven high.

9. The method of claim 1, further comprising disabling the injection stage in response to a signal indicating that the switching power converter is experiencing a transient event.

10. The method of claim 1, wherein the at least one parameter of the switching power converter comprises one of magnitude of a voltage and magnitude of a current.

11. The method of claim 1, wherein the switching power converter has a topology selected from the group consisting of a multi-phase buck-type topology, a multi-phase boost-type topology, and a multi-phase buck-boost-type topology.

12. A switching power converter, comprising:
a plurality of power stages, each power stage including a respective power transformer;
an injection stage including an injection transformer that is electrically coupled to a respective secondary winding of each power transformer; and
a controller configured to:
control duty cycle of the plurality of power stages to regulate at least one parameter of the switching power converter, and
control the injection stage to reduce voltage across leakage inductance of each power transformer.

13. The switching power converter of claim 12, wherein a secondary winding of the injection transformer is electrically coupled in series with the respective secondary winding of each power transformer.

14. The switching power converter of claim 13, further comprising a tuning inductor electrically coupled in series with the respective secondary winding of each power transformer.

15. The switching power converter of claim 13, wherein:
each power stage includes a respective power switching stage electrically coupled to a primary winding of the respective power transformer of the power stage; and
the injection stage includes an injection switching stage electrically coupled to a primary winding of the injection transformer.

16. The switching power converter of claim 15, further comprising a capacitor electrically coupled to the primary winding of the injection transformer.

17. The switching power converter of claim 12, wherein the switching power converter has a topology selected from the group consisting of a multi-phase buck-type topology, a multi-phase boost-type topology, and a multi-phase buck-boost-type topology.

18. The switching power converter of claim 12, wherein two or more of the plurality of power stages are part of different respective power sub-converters.

19. A switching power converter, comprising:
a first power sub-converter including one or more first power stages, each first power stage including a respective first power transformer, wherein a primary winding of each first power transformer is electrically coupled to a first power node;
a second power sub-converter including one or more second power stages, each second power stage including a respective second power transformer, wherein a primary winding of each second power transformer is electrically coupled to a second power node that is different from the first power node;
a tuning inductor electrically coupled in series with a secondary winding of each first power transformer and with a secondary winding of each second power transformer; and
an injection stage including an injection transformer that is electrically coupled to a respective secondary winding of each power transformer.

20. The switching power converter of claim 19, wherein:
each first power stage further includes a respective power switching stage electrically coupled to the primary winding of the first power transformer of the first power stage; and
each second power stage further includes a respective power switching stage electrically coupled to the primary winding of the second power transformer of the second power stage.

* * * * *